(12) United States Patent
Klopp et al.

(10) Patent No.: US 7,424,940 B2
(45) Date of Patent: Sep. 16, 2008

(54) ADJUSTMENT DEVICE FOR PRODUCING A TWO-SIDED ROTATIONAL MOVEMENT

(75) Inventors: Marcus Klopp, Coburg (DE); Stephanie Angermüeller, Weidhausen (DE); Matthias Weiβ, Rödental (DE); Georg Scheck, Weitramsdorf (DE); Frieder Krüger, Grub (DE)

(73) Assignee: Brose Fahrzeugteile GmbH & Co KG, Coburg ( * ) Notice: Subject to any disclaimer, the term of this patent is extended or adjusted under 35 U.S.C. 154(b) by 220 days.

(21) Appl. No.: 10/571,411

(22) PCT Filed: Sep. 9, 2004

(86) PCT No.: PCT/DE2004/002048

§ 371 (c)(1),
(2), (4) Date: Mar. 9, 2006

(87) PCT Pub. No.: WO2005/024264

PCT Pub. Date: Mar. 17, 2005

(65) Prior Publication Data

US 2007/0068760 A1    Mar. 29, 2007

(30) Foreign Application Priority Data

Sep. 10, 2003 (DE) ................. 103 42 491
Dec. 16, 2003 (DE) ................. 103 61 148

(51) Int. Cl.
*F16D 67/02* (2006.01)
(52) U.S. Cl. ...................... 192/15; 192/17 D
(58) Field of Classification Search ............ 192/15, 192/17 R, 17 D, 19, 12 A
See application file for complete search history.

(56) References Cited

U.S. PATENT DOCUMENTS 4,646,888 A * 3/1987 Higuchi et al. ........... 192/223.4

(Continued)

FOREIGN PATENT DOCUMENTS

DE     3105044 A1 * 2/1982

(Continued)

OTHER PUBLICATIONS

International Search Report. dated Feb. 15, 2005, corresponding to PCT/DE2004/002048.

(Continued)

*Primary Examiner*—Ha D. Ho
(74) *Attorney, Agent, or Firm*—Christie, Parker & Hale, LLP.

(57) ABSTRACT

An adjustment device for producing a two-sided rotational movement for window lifters and seat adjusters in motor vehicles, containing a drive element; an angle-shifting element with a hollow cylindrical bearing surface, driven by actuation of the drive element; a driven element; a coupling arranged in the power flux between the drive element and the driven element, transmitting an adjustment movement of the drive element exclusively to the driven element when the drive element is moved from a neutral initial position in one direction or another, in addition to a brake lock arranged between the driven element and the output element, blocking torque introduced on the output side; in addition to a reset device which returns the drive element to a neutral initial position. The coupling is provided with a reinforcing lever, which is actively connected to the drive element.

31 Claims, 27 Drawing Sheets

U.S. PATENT DOCUMENTS

| | | | |
|---|---|---|---|
| 5,681,005 A * | 10/1997 | Ligon et al. | 242/394.1 |
| 6,527,095 B2 * | 3/2003 | Assel | 192/17 R |
| 6,945,600 B2 * | 9/2005 | Liu | 297/284.4 |
| 7,032,731 B2 * | 4/2006 | Kim | 192/15 |
| 7,311,190 B2 * | 12/2007 | Diez-Martinez Cervantes | 192/223 |

FOREIGN PATENT DOCUMENTS

| | | | |
|---|---|---|---|
| DE | 199 07 483 A1 | 8/2000 |
| DE | 101 46 771 A1 | 4/2003 |
| GB | 2 054 725 A | 2/1981 |

OTHER PUBLICATIONS

English translation of International Preliminary Examination Report for corresponding PCT application No. PCT/DE2004/002048, dated Jul. 10, 2006.

* cited by examiner

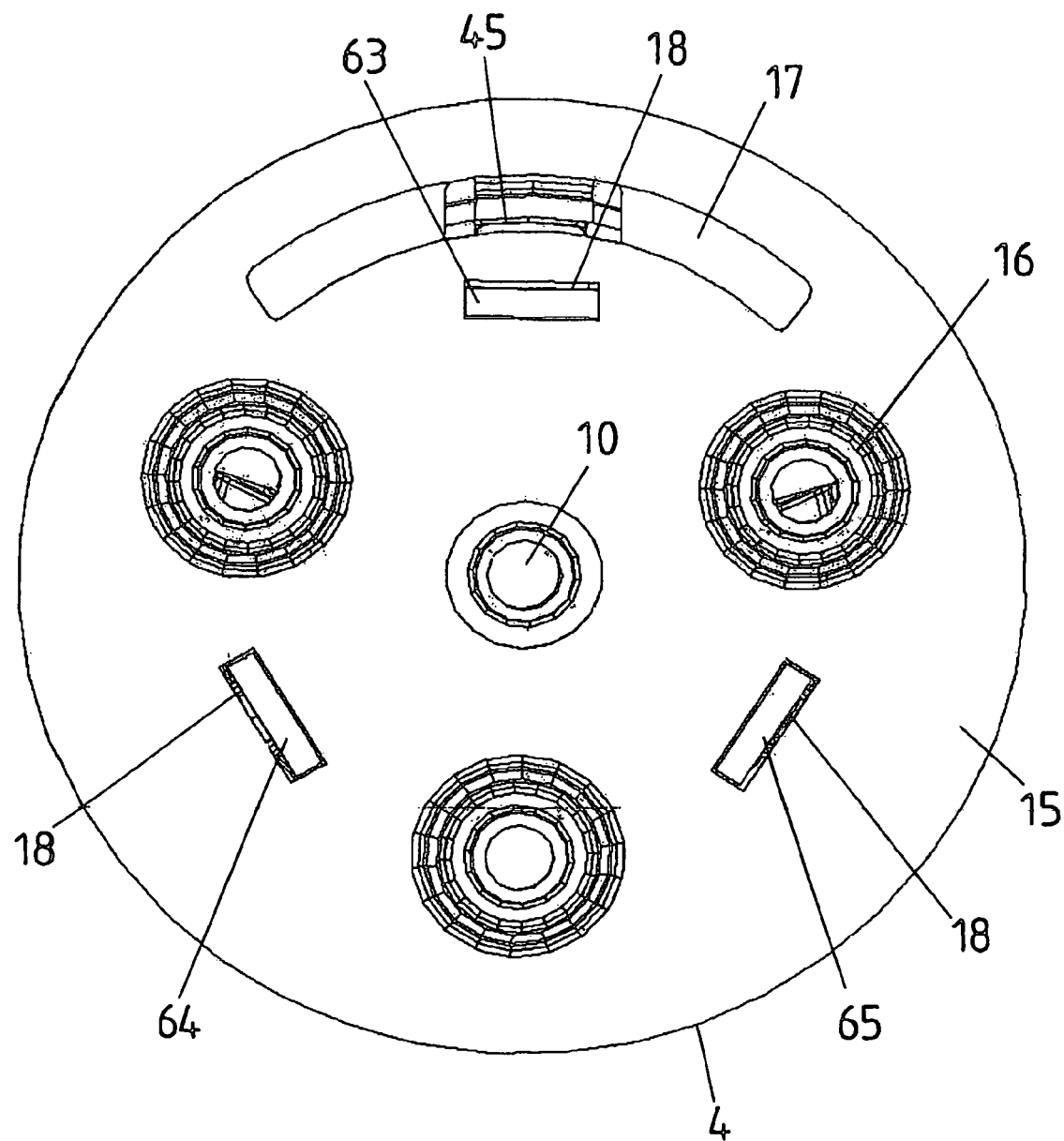

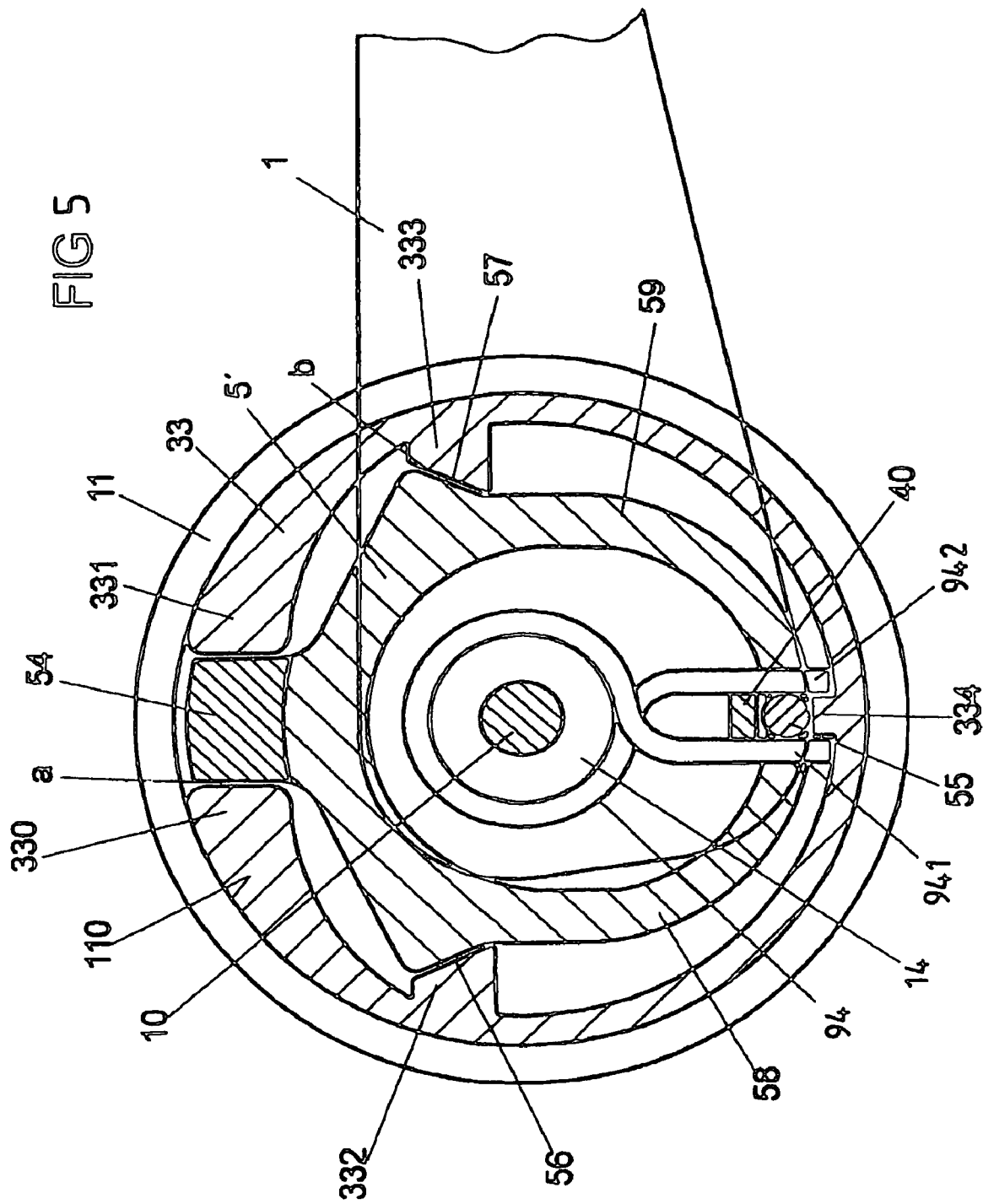

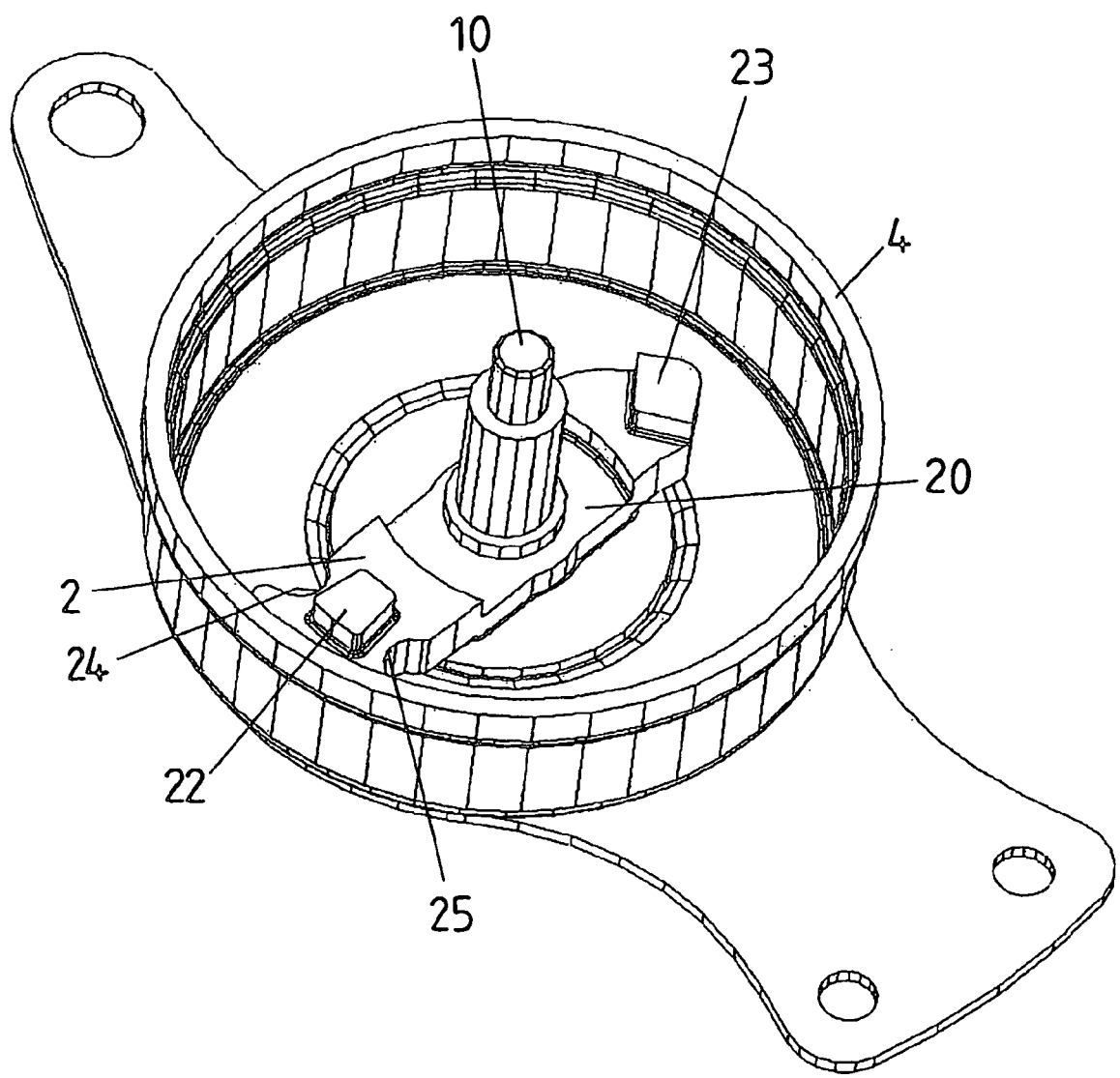

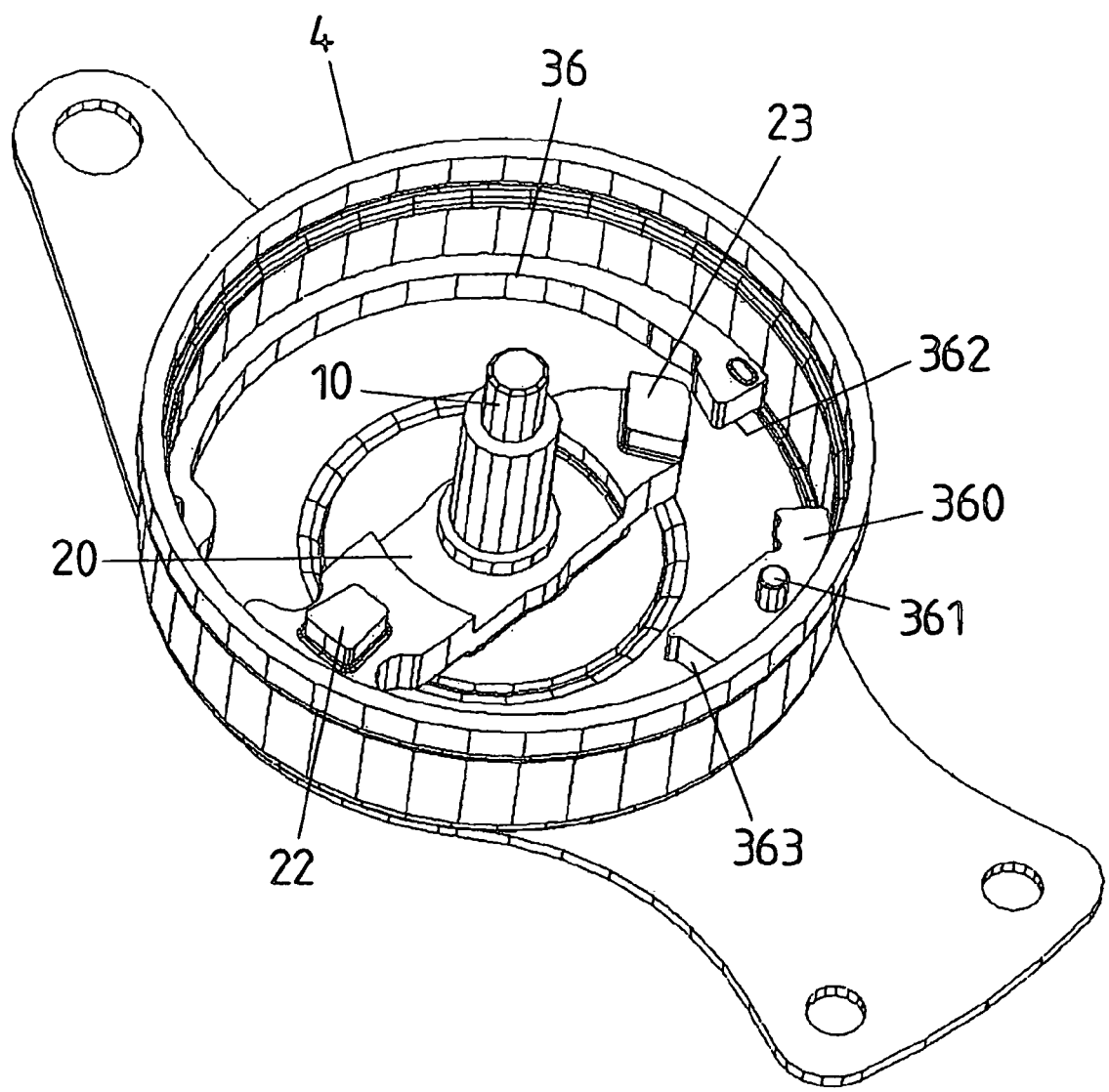

ADJUSTMENT DEVICE FOR PRODUCING A TWO-SIDED ROTATIONAL MOVEMENT

CROSS-REFERENCE TO A RELATED APPLICATION

This application is a National Phase Patent Application of International Application Number PCT/DE2004/002048, filed on Sep. 9, 2004, which claims priority of German Patent Applications Number 103 42 491.1, filed on Sep. 10, 2003 and 103 61 148.7, filed on Dec. 16, 2003.

BACKGROUND

The invention relates to an adjustment device for producing a two-sided rotational movement.

From German Patent Application Publication No. DE 199 07 483 an adjustment device acting on two sides for producing a rotational movement is known which has a housing in which are mounted a drive element and an output element which can be adjusted angularly through actuation of the drive element, as well as a loop spring which is supported at least partially on the inside wall of the housing and thereby blocks torque introduced on the output side and is contracted when torque is introduced on the drive side and thereby releases the transfer of torque from the drive element to the output element. The ends of the loop spring are connected to a transfer element which is mounted between the drive element and the output element and has a base body mounted circular segment shape round the axis of the output element. To reduce the play during transfer of torque from the drive element to the output element the housing tapers towards the axis of the output element whilst the transfer element or loop springs are pretensioned axially towards the reducing housing diameter.

The drive element can in the case of the known adjustment device be provided additionally with a radially or circumferentially guided compensating element which bears free of play against the stop faces of the transfer element and consists of two scissor levers which are displaceable opposite one another in the circumferential direction, as well as of a radially spring-loaded wedge slider which is disposed between the scissor levers and is mounted in a guide of the drive element, wherein the wedge slider is provided with a central spring-loaded wedge guide guided in the guide of the drive element so that its radial displacement in the guide of the drive lever exerts a circumferentially acting force on the scissor lever and thereby ensures sufficient freedom of play.

An adjustment device of this kind is suitable both for transferring torque on the drive side from a drive element to a driven element and also as a brake lock for blocking torque introduced from the output side of the adjustment device. The use of a loop spring as force transfer element for transferring the adjustment movement of the drive element to the driven element or as brake element for blocking an output-side torque by expanding the loop spring and producing a block through the cylindrical contact face of the loop spring bearing against a locally-fixed adjustment housing, requires precision matching of the force transfer elements in order on the one hand to ensure the maximum possible play-free force transfer from the drive element to the driven element and a secure blocking of the torque introduced on the output side as soon as this is greater than or equal to the torque introduced on the drive side.

A further problem lies in moving the drive element reliably back into the neutral starting position after an adjustment movement has been made and when the adjustment system is relaxed without thereby triggering any unintended adjustment of the adjustable mechanism of a motor vehicle connected to the adjustment device.

Since adjustment devices of this kind are now used in greater numbers attempts are made to lower the production costs whilst providing lower manufacturing and installation expense and lighter weight for installation in a motor vehicle.

The object of the present invention is to provide an adjustment device of the type mentioned at the beginning which with the same functioning principle is suitable both for a drive and for a brake lock, enables simple mounting of the spring element and guarantees good force transfer between the drive element and the driven element or ensures secure blocking of torque introduced on the output side and reliable resetting of the function elements of the adjustment device into the neutral starting position independently of the spring force of the spring element.

BRIEF DESCRIPTION

This is achieved for a drive for the force transfer from a drive element to a driven element in that the coupling or brake lock contains at least one loop spring band which has a circumference of less than 360° and bearing faces for transferring force from the drive element to the driven element or from the driven element to the output element or from the output element to the adjustment housing.

The solution according to the invention enables a simple and more particularly floating bearing of the loop spring band used as spring element as well as through the reinforcement lever acting on the spring ends a good force transfer between the drive element and the driven element so that a secure blocking of torque introduced on the output side and a secure resetting of the function elements of the adjustment device into the neutral starting position independently of the spring force of the spring element are guaranteed.

The coupling preferably has a reinforcement lever in active connection with the drive element and a loop spring band bearing with pretension at least partially on the hollow cylindrical bearing face of the driven element, with the spring ends of the spring in active connection with the reinforcement lever.

The reinforcement lever is rotatable with play about the adjustment axis, has at least one cam which is positioned between the spring ends of the loop spring band and which to transfer drive torque emanating from the drive element through swivel movement of the drive element out from the neutral starting position widens out the loop spring band so that it bears with friction engagement against the hollow cylindrical bearing face of the drive top, and is in active connection with the transfer levers which during resetting of the drive element from the deflected position into the neutral starting position act on the support arms angled from the loop spring band so that the loop spring band is drawn together and its friction contact against the hollow cylindrical contact bearing face of the drive top is lifted.

In addition to the floating mounted loop spring band the coupling has in a first and second embodiment two transfer levers attached to a drive axis of the drive element and of the driven element and each with a radial lever arm which are each opposed by a support arm angled from the loop spring band to form at its inwardly directed end one of the spring ends of the loop spring band, and with a second lever arm which bears against a stop fixed on the housing and against a connecting bolt of the reinforcement lever with the drive element whereby resetting springs mounted between the transfer levers in order to reset the loop spring band and the drive element each press in dependence on the resetting direction one radial lever arm of the transfer levers against one of the angled support arms of the loop spring band and whereby to reset the drive element each press in dependence on the direction of the resetting movement a second lever arm against the connecting bolt which is connected to the drive element.

A secure resetting of both the drive element and loop spring band into a neutral starting position is thereby guaranteed by a single spring independently of the spring force of the loop spring band.

Two transfer levers attached to the adjustment axis are preferably provided which have lever arms emanating radially from the adjustment axis and associated with an angled support of the loop spring band, bear against a stop fixed on the housing and are in active connection with the reinforcement lever. Furthermore at least one resetting spring is mounted between the transfer levers and to reset the loop spring band and the drive element connected to the reinforcement lever presses in dependence on the direction of the resetting action each one radial lever arm of the transfer levers against one of the angled support arms of the loop spring band and against stops of the reinforcement lever.

In a first embodiment a resetting spring is mounted on two lever projections, which extend from the radial lever arms of the transfer levers and are curved in the circumferential direction and which extend concentric with the adjustment axis each from the radial lever arm of the one transfer lever to the radial lever arm of the other transfer lever and are aligned relative to each other as well as are able to move past one another, and is supported on the radial lever arms of the transfer levers.

In the second embodiment the transfer levers have a second lever arm which bears against a stop fixed on the housing and against a connecting bolt of the reinforcement lever with the drive element. To reset the drive element in dependence on the direction of the resetting movement each one of the second lever arms of the transfer levers presses against the connecting bolt which is connected for articulated movement to the drive element.

In this second embodiment two resetting springs are guided on the curved lever projections of the transfer levers and are supported on the radial and the second lever arms of the transfer levers. Through contact noses on the radial lever arms of the transfer levers which bear against the angled support arms of the loop spring band and between which and the angled support arms in the neutral starting position of the drive element there is a slight play and which to reset the loop spring band and the drive element press against the angled support arms of the loop spring band, an optimum peripheral force engagement is guaranteed for resetting the loop spring band and the drive element Furthermore in this second embodiment the one spring ends and the ends of the angled support arms of the loop spring band can be connected to one another through webs whereby the angled support arms of the loop spring band can have a crack connection. Alternatively to lower the production costs the spring ends of the loop spring band are not cracked but thickened.

To secure the radial mobility when transferring force from an actuating lever to the driven element or drive top the reinforcement lever is connected to the adjustment axis through an oblong hole.

In the embodiment with a resetting spring contact noses are mounted at the end of the radial lever arms of the transfer levers whereby stop cams protrude from the contact noses in the axial direction and bear against the stops fixed on the housing. In this embodiment the reinforcement lever is formed in two parts and has a cam formed on the first reinforcement lever part and mounted between the spring ends of the loop spring band, is mounted with an oblong hole about the adjustment axis and contains a diagonally opposing first connecting element which is connected to a second connecting element of a second reinforcement lever part which has a bore arranged about the adjustment axis and two stops bearing against the stop cams of the transfer levers whereby the two reinforcement lever parts are mounted one above the other in the axial direction. Webs can protrude from the surface of the second reinforcement lever part which is remote from the first reinforcement lever part and these webs project through slits running in the circumferential direction in a housing cover which is connected to the adjustment housing to fit into receiving slots in a lever screw-on plate connectable to an actuating lever or an actuating wheel.

In a third embodiment the reinforcement lever has two bearing faces which are arranged symmetrical relative to the drive axis and run diagonal to an axis of symmetry leading from the connection of the reinforcement lever to the spring ends of the loop spring band to the active connection of the reinforcement lever with the drive element, whereby the bearing faces are opposite the corresponding end faces of two angled support arms of the loop spring band whereby the spring ends of a centering and resetting spring which is mounted concentric with the drive axis bear against a locally fixed stop at the active connection between the reinforcement lever and the drive element and a projection of the loop spring band.

Also in this embodiment the solution according to the invention ensures a simple and more particularly floating bearing of the at least one loop spring band used as spring element as well as a good force transfer from the actuating lever to the driven element.

In one embodiment as brake lock for blocking output-side torque and for transferring drive-side torque which are introduced by way of example from one of the aforesaid adjusting drives, the adjustment device has at least one loop spring band which for blocking an output-side torque is supported on the adjustment housing, reinforcement levers mounted between the spring ends of the loop spring band and the drive element and which with a torque on the output side which is greater than torque on the drive side widen the loop spring band for friction contact against the adjustment housing, and also has at least first control elements of the drive top bearing against the angled support arms of the loop spring band which when the torque on the drive side is greater than torque on the output side lift the friction bearing contact of the loop spring band against the adjustment housing, whereby second control elements of the drive top are additionally in active connection with the output element, and whereby middle bearing faces of the reinforcement levers bear against the angled support arms of the loop spring band.

In this embodiment as a brake lock the control elements engender the blocking of torque on the output side and the release of torque on the drive side from the drive element or driven element to the output element.

The output element can contain an output lever mounted between the reinforcement levers and connected to an output pinion which is mounted concentric with the adjustment axis so that optimum force transfer is guaranteed from the drive element or driven element to the output element.

The reinforcement levers have outer bearing faces disposed between the spring ends of the loop spring band and also have stop noses opposite the outer bearing faces and bearing against the output element whilst the control elements of the driven element or drive top projecting into the adjustment housing bear on the stops of the transfer levers and the angled support arms of the loop spring band.

The force transfer from the transfer levers to the loop spring bands is preferably controlled in that the angled support arms of the loop spring band for blocking the loop spring band bear against a middle contact bearing face of the reinforcement levers whilst the spring ends of the loop spring bands are supported on the outer bearing face of the reinforcement levers and assist the rotational movement of the loop spring band.

In this embodiment the brake lock has two axially off-set loop spring bands which are supported on the adjustment housing for blocking torque on the output side, and, for the reciprocal tensioning of the loop spring bands for their bearing contact against the hollow cylindrical adjustment housing, the angled support arms of the loop spring bands contain sockets for a leaf spring which connects the angled support arms to one another, tensions the loop spring bands circumferentially opposite one another whereby the outer spring ends press against the outer bearing faces of the reinforcement levers and the reinforcement levers are supported in a central region by their bearing faces against the angled spring ends and thereby press with their bearing faces provided at the other ends against the output lever so that the output is set free of play.

In a further embodiment the brake lock has two oppositely displaceable reinforcement levers which are pretensioned through at least one spring element whereby the outer spring ends of the loop spring band press against the outer bearing faces of the one end of the reinforcement levers, the reinforcement levers are supported in a central region on the stop faces of the central substantially radially aligned support arms and the bearing faces disposed on the other ends of the reinforcement levers bear against the output element.

The angled support arms of the loop spring bands can have sockets for a curved preferably centrally supported leaf spring which connects the angled support arms of the loop spring bands to one another.

As an alternative the spring element can consist of a compression spring which is mounted between the outer bearing face of the reinforcement levers bearing against the outer spring ends of the loop spring bands, or bears against opposing contact shoulders of the loop spring bands.

At least one pair of contact bearing faces of the reinforcement levers thereby has on either side of an axis of symmetry formed by the adjustment axis and output element an angular path relative to this axis of symmetry so that the output is set free of play and the loop spring band is pretensioned to the adjustment housing.

For the prompt transfer of force from the drive claws to the loop spring band at least one entrainment spring is mounted between the stops on either side of the loop spring band and the drive claws.

In order to eliminate play from the driven element to the output element the reinforcement levers are pretensioned towards the output element through a spring element which is mounted between the drive axis and the inner stops of the reinforcement lever.

The output lever can have recesses for holding shaped members of the bearing faces of the brake reinforcement levers which lie opposite the contact bearing faces bearing on the outer spring ends of the loop spring bands, and have an output cam on which the second control elements of the driven element or drive top bear.

BRIEF DESCRIPTION OF THE DRAWINGS

The invention and further details of the invention will now be explained in further detail with reference to embodiments illustrated in the drawings for adjustment devices designed as an adjusting drive and as a brake lock.

FIG. 3E is a fifth section through an adjustment drive with a single resetting spring between transfer levers in individual phases of the assembly of the adjustment drive.

FIG. 5 is a section through an adjustment drive with a coupling between an actuating lever and a drive top driven by the actuating lever in a third embodiment with jam-free resetting of the drive element.

FIG. 9B is a second perspective view of individual phases of the assembly of the adjustment device designed as a brake top according to FIG. 8.

FIG. 9C is a third perspective view of individual phases of the assembly of the adjustment device designed as a brake top according to FIG. 8.

Figure 1:
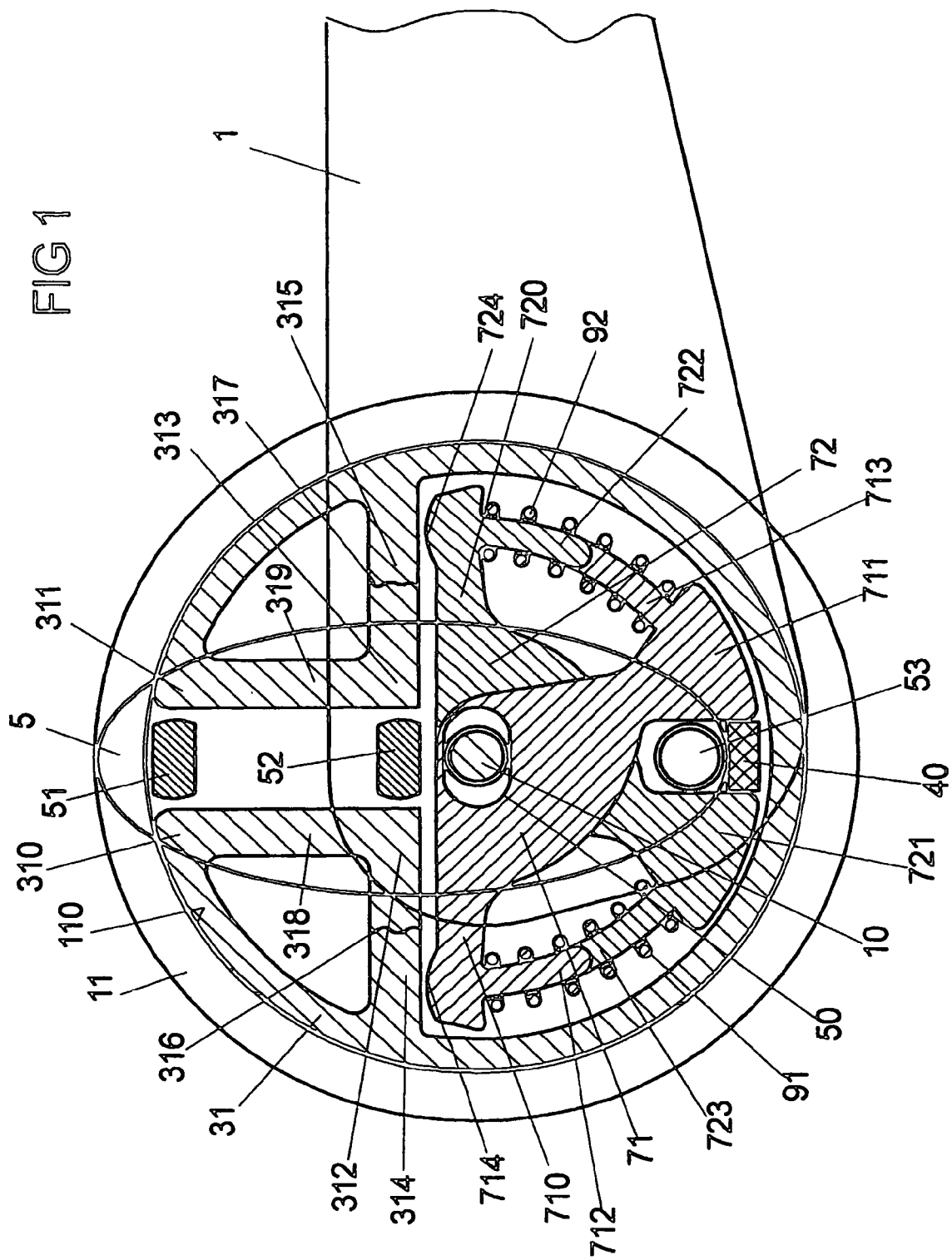
FIG. 1 shows a section through an adjustment drive with a coupling between an actuating lever and a drive top driven by the actuating lever in a first embodiment of a loop spring band.

The section illustrated in FIG. 1 through a first embodiment of an adjustment device shows an element 11 driven in rotation about an adjustment axis 10 and which owing to its structural configuration will be termed hereinafter a "drive top" with a hollow cylindrical bearing face 110. The drive top 11 is rotated depending on the swivel direction of the actuating lever 1 in one or other direction about the adjustment axis 10 with the interposition of adjustment drives described below with reference to FIGS. 1 to 5 by an actuating lever 1 which can swivel about the adjustment axis 10 as drive element.

A loop spring band 31 with floating support is inserted pretensioned into the hollow cylindrical inner space of the drive top 11 so that the loop spring band 31 would spring up if removed from the hollow cylindrical inner space of the drive top 11. The loop spring band 31 has several spring ends 310-313 of which the outer spring ends 310, 311 are formed at the end of the loop spring band 31 and second spring ends 312, 313 are formed at the ends of angled support arms 314, 315 of the loop spring band 31. Both spring ends 310 to 313 are each connected to one another through a web 318, 319.

Between the spring ends 310 to 313 of the loop spring band 31 lie the cams 51, 52 of a reinforcement lever 5 which is mounted via an oblong hole 50 on the adjustment axis 10 and has on the side opposite the cams 51, 52 in relation to the adjustment axis 10 a connecting bolt 53 which connects the reinforcement lever 5 to the actuating lever 1.

The angled support arms 314, 315 of the loop spring band 31 have a crack connection 316, 317 which is produced for example by breaking the loop spring band 31 and inserting a pivot so that the outer spring ends 310, 311 of the loop spring band 31 are supported with accurate tight fit with pressure on the angled support arms 314, 315. Through this configuration of the spring ends 310, 311 of the loop spring band 31 the forces exerted by the cams 51, 52 of the reinforcement lever 5 on the loop spring band 31 are taken up without problem and guarantee a flexible force build up of the loop spring band 31.

Two transfer levers 71, 72 are mounted on the adjustment axis 10 and each oppose by contact noses 714, 724 formed at the ends of two radial lever arms 710, 720 the angled support arms 314, 315 of the loop spring band 31 with play and only bear against the angled support arms 314, 315 of the loop spring band during resetting. The transfer levers 71, 72 are supported on the connecting bolt 53 of the reinforcement lever 5 and on a stop 40 fixed on the housing through second lever arms 711, 712 which are opposite in relation to the attachment to the adjustment axis 10.

On the lever projections 712, 713; 722, 723 of the transfer levers 71, 72, which each extend from the radial lever arm 710, 720 of the one transfer lever 71, 72 to the second lever arm 711, 721 of the other transfer lever 71, 72, are aligned relative to each other and can be moved past one another, are mounted resetting springs 91, 92 which are supported on the radial or second lever arms 710, 711, 720, 721 and serve both for centering or returning the actuating lever 1 and for resetting the loop spring band 31 into the neutral initial position.

The function of the adjustment drive illustrated in FIG. 1 will now be explained below.

If the actuating lever 1 is pivoted in one or other direction about the adjustment axis 10 then the connecting bolt 53 is likewise turned in the swivel direction and the transfer lever 71 or 72 bearing in the case of this swivel direction by its second lever arm 711, or 721 on the connecting bolt 53 is also rotated so that the two resetting springs 91, 92 are compressed. Through the connection of the actuating lever 1 on the connecting bolt 53 the reinforcement lever 5 is also co-rotated until the cams 51, 52 after a short idle path come to bear on the spring ends 310 to 313 of the loop spring band 31 and entrain the loop spring band 31 into the rotational direction about the adjustment axis 10 corresponding to the swivel direction of the actuating lever 1. By way of example with a swivel movement of the actuating lever 1 about the adjustment axis clockwise the cam 51 comes to bear against the spring end 311 and the cam 52 comes to bear against the spring end 312 whilst during swivel movement of the actuating lever 1 about the adjustment axis anticlockwise the cam 51 comes to bear against the spring end 310 and the cam 52 against the spring end 313 so that a crossed bearing contact of the cams 51, 52 against the spring ends 310 to 313 is provided each time.

The resetting springs 91, 92 are thereby tensioned further up to the end of the swivel stroke of the actuating lever 1 whilst the contact noses 714, 724 at the first lever arms 710, 720 of the transfer levers 71, 72 keep a distance from the angled support arms 314, 315 of the loop spring band 31 when the reinforcement lever 5 is located outside of the neutral initial position.

If at the end of the adjustment stroke no more force acts on the actuating lever 1 then the resetting springs 91, 92 to reset the actuating lever 1 press the transfer levers 71, 72 towards the neutral initial position. Through the bearing contact of the second lever arms 711, 721 of the transfer levers 71, 72 against the connecting bolt 53 the actuating lever 1 which is likewise attached to the connecting bolt 73 is also entrained until the reinforcement lever 5 is located in the neutral initial position and the contact noses 714, 724 of the radial lever arms 710, 720 of the transfer levers 71, 72 bear against the angled support arms 314, 315 of the loop spring band 31. In this tension-free neutral initial position the functioning elements of the adjustment device move easily and smoothly i.e. substantially free of friction, back into the neutral initial position.

Figure 2:
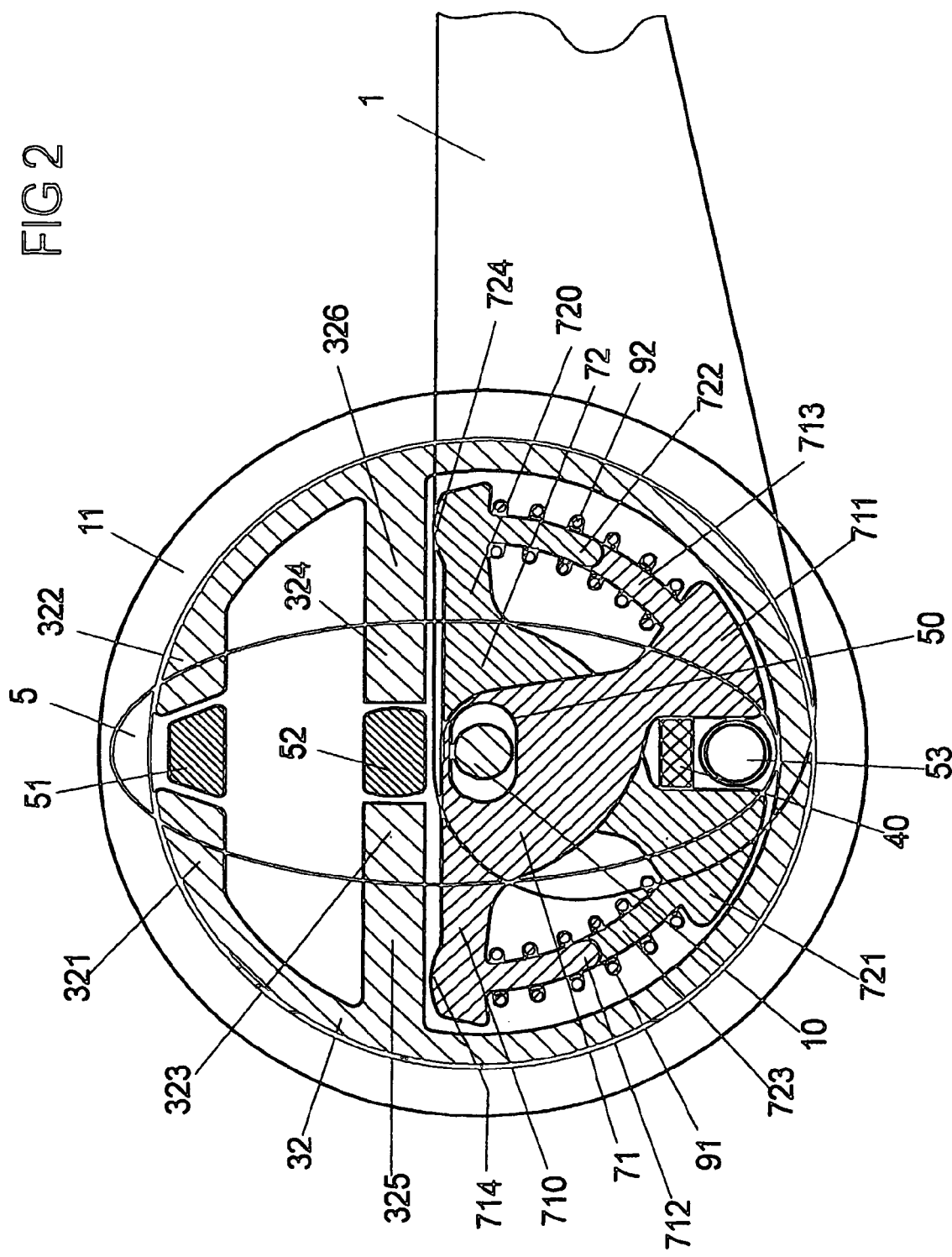
FIG. 2 is a sectional view through an adjustment drive with a coupling between an actuating lever and a drive top driven by the actuating lever in a second embodiment of a loop spring band.

The second embodiment of an adjustment drive illustrated in sectional view in FIG. 2 differs from the first embodiment illustrated in cross sectional view in FIG. 1 in that to simplify the manufacture of the adjustment drive no crack connection is required at the spring end of a loop spring band 32 but outer spring ends 321, 322 of the loop spring band 32 are made thicker and stand opposite the first cams 51 of the reinforcement lever 5 whilst angled support arms 325, 326 of the loop spring band 32 form second—thickened where necessary—spring ends 323, 324 which are opposite the second cam 52 of the reinforcement lever 5.

The further construction and function of the second variation of an adjustment drive illustrated in cross section in FIG. 2 corresponds with matching reference numerals to the construction of the function of the first variation illustrated in cross section in FIG. 1 so that reference is made here to the above description of FIG. 1.

Figure 3A:
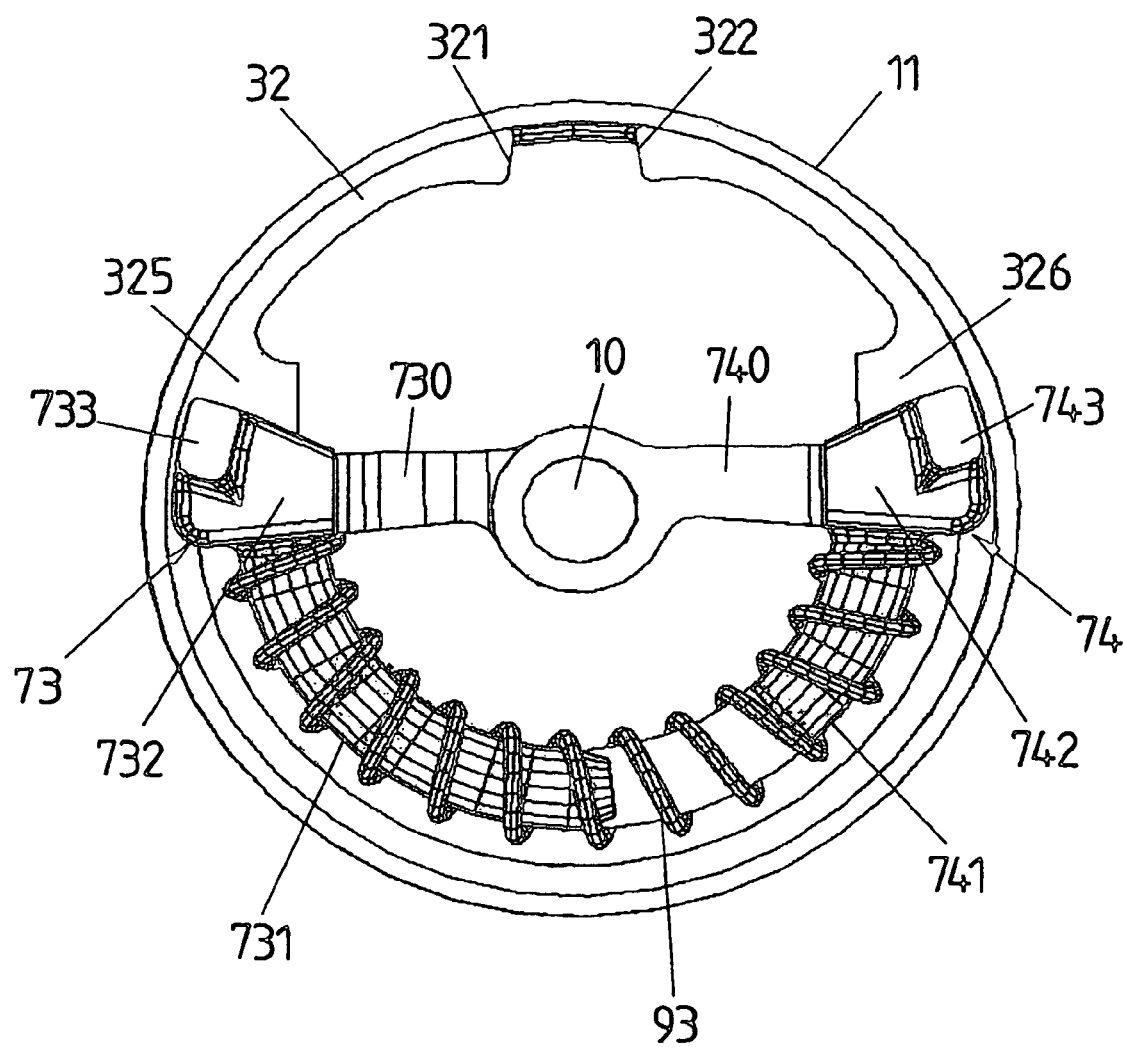
FIG. 3A is a first section through an adjustment drive with a single resetting spring between transfer levers in individual phases of the assembly of the adjustment drive.
Figure 3B:
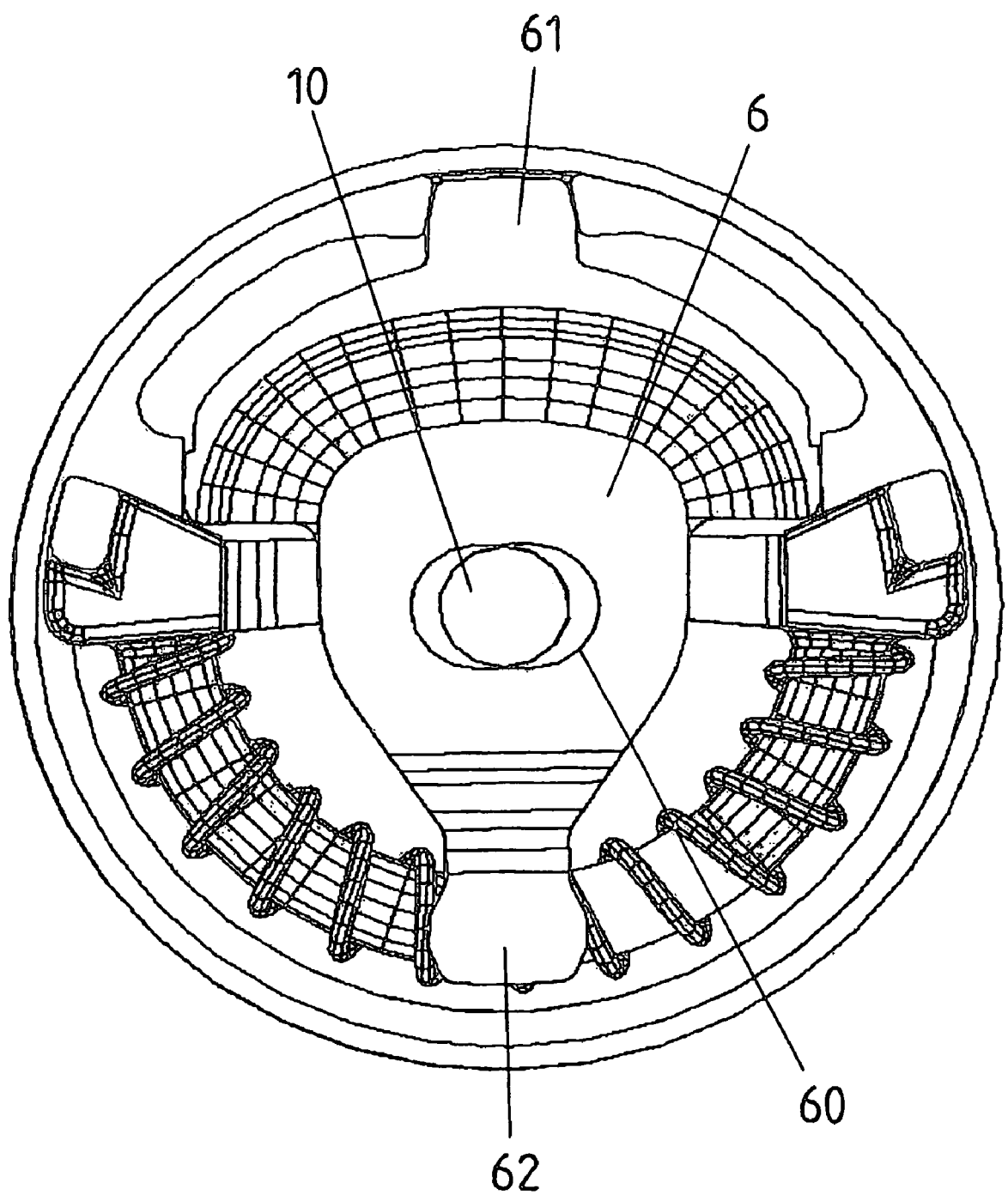
FIG. 3B is a second section through an adjustment drive with a single resetting spring between transfer levers in individual phases of the assembly of the adjustment drive.
Figure 3C:
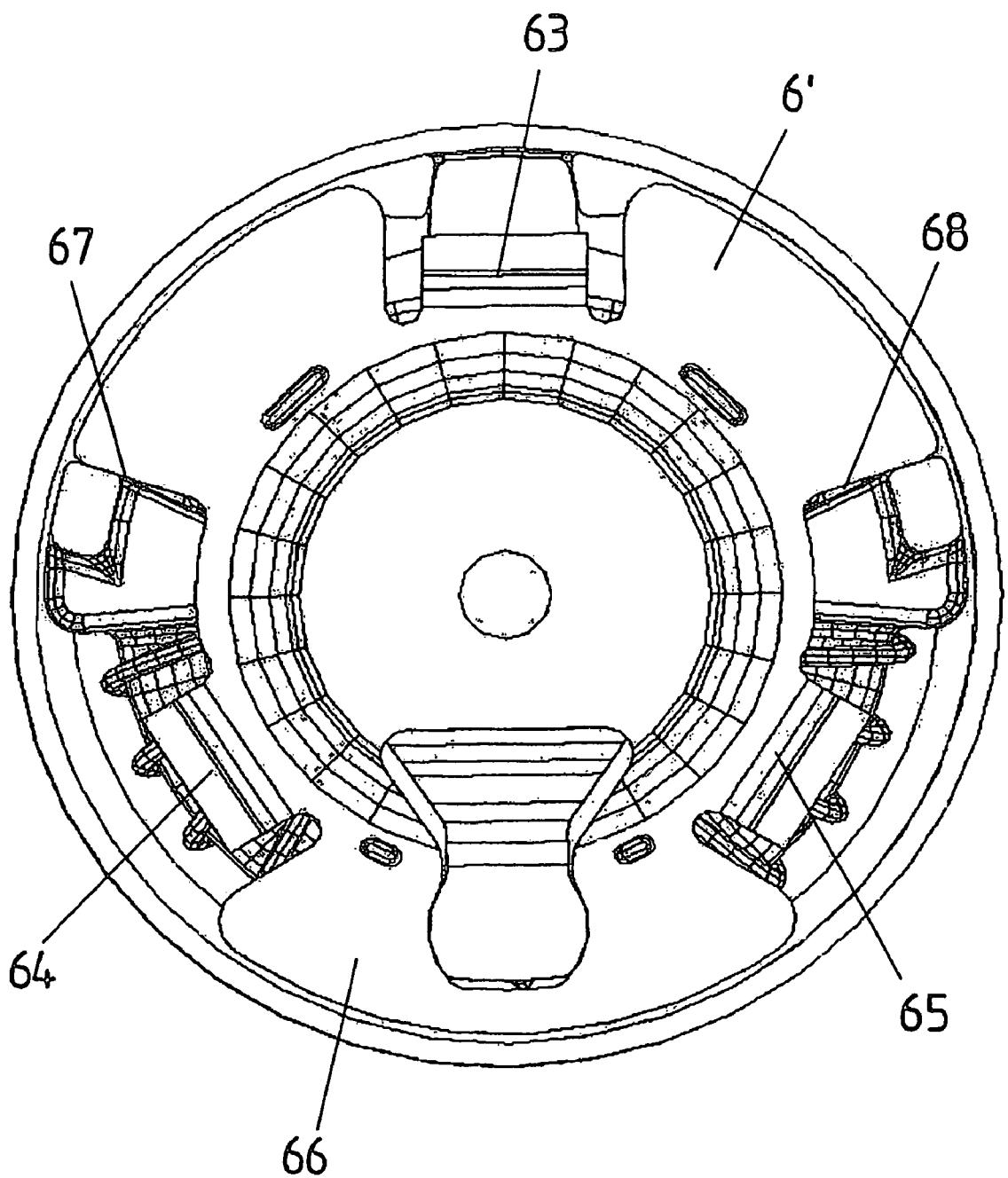
FIG. 3C is a third section through an adjustment drive with a single resetting spring between transfer levers in individual phases of the assembly of the adjustment drive.

With the adjustment drive illustrated in successive assembly phases in plan view in FIGS. 3A to 3E and in perspective view in FIGS. 4A to 4H a reinforcement lever 6, 6' is designed in two parts and has in a first plane a first reinforcement lever part 6 which according to FIG. 3b has a cam 61 mounted between the outer thickened spring ends 321, 322 of the loop spring band 32, an oblong hole 60 surrounding the adjustment axis 10 and a first connecting part 62 which is opposite the cam 61 in relation to the oblong hole 60.

Two transfer levers 73, 74 mounted axially offset relative to each other have according to FIG. 3A two radial lever arms 730, 740 mounted axially one above the other and attached via bore on the adjustment axis 10 whereby the ends of the lever arms opposite the adjustment axis 10 have contact noses 732, 742 which stand with play opposite angled support arms 325, 326 of the loop spring band 32 and only bear against the angled support arms 325, 326 of the loop spring band 32 when the adjustment drive is reset. Furthermore the contact noses 732, 742 of the transfer levers 73, 73 have two cams 733, 743 protruding axially from the contact noses 732, 742 and bearing in a second plane against stops fixed on the housing.

Analogous with the configuration of the adjustment drives according to FIGS. 1 and 2 the transfer levers 73, 74 have lever projections 731, 741 bent concentric with the adjustment axis 10 and each extending from the radial lever arm 730, 740 of the one transfer lever 73, 74 to the bent lever projection 731, 741 of the other transfer lever 73, 74 and are aligned relative to each other. A resetting spring 93 is mounted on the lever projections 731, 741 and is supported on the contact noses 732, 742 of the transfer levers 73, 74 thereby serving both to centre and return the actuating lever and to reset the loop spring band 32 into the neutral initial position.

Figure 4A:
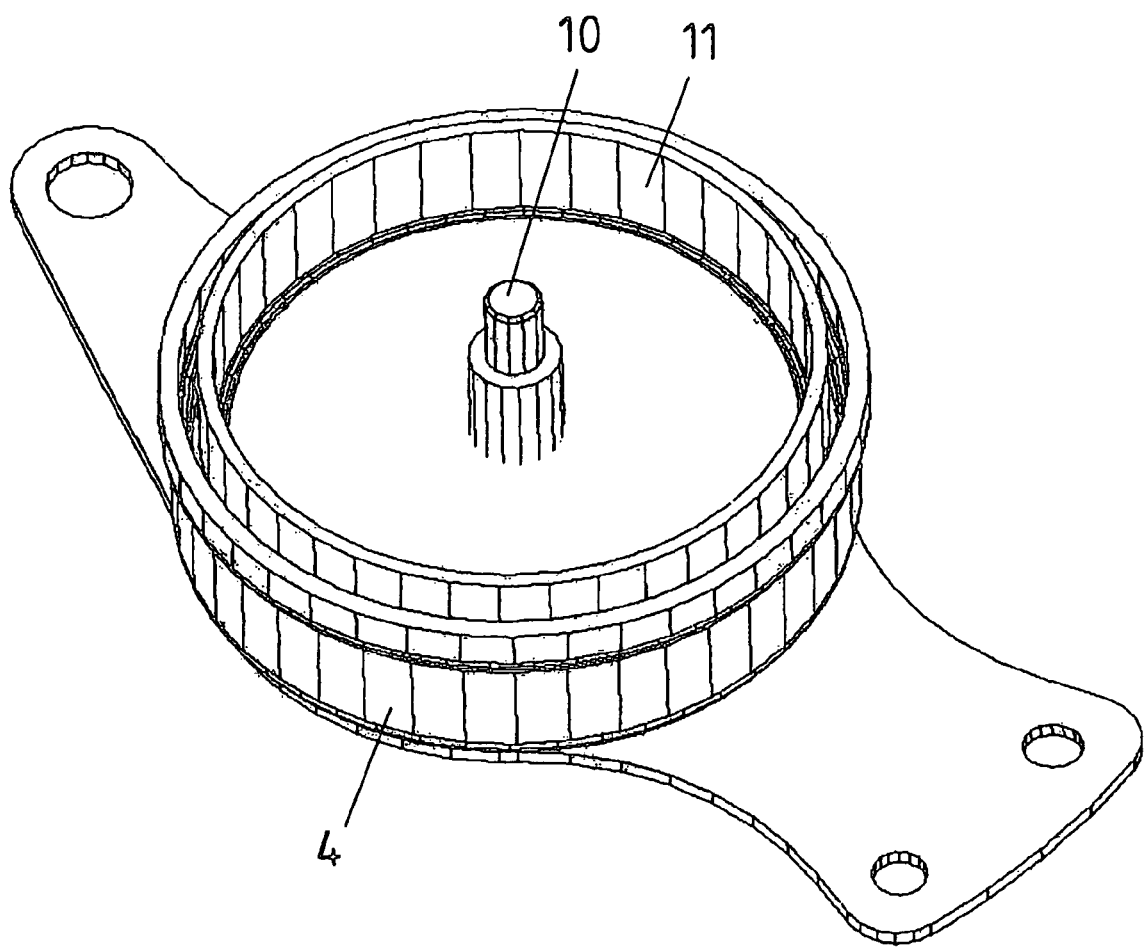
FIG. 4A is a first perspective view of individual phases of the assembly of the adjustment drive according to FIG. 3.

FIG. 4A shows in a perspective view the hollow cylindrical adjustment housing 4 of the adjustment device with laterally protruding flanges for fixing the adjustment device on one of two adjustment elements which are displaceable relative to each other. The adjustment housing 4 is mounted concentric about an adjustment axis 10 and surrounds a drive top 11 which is mounted concentric with the adjustment housing 4 and which is turned by an actuating lever into one or other direction about the adjustment axis 10.

Figure 4B:
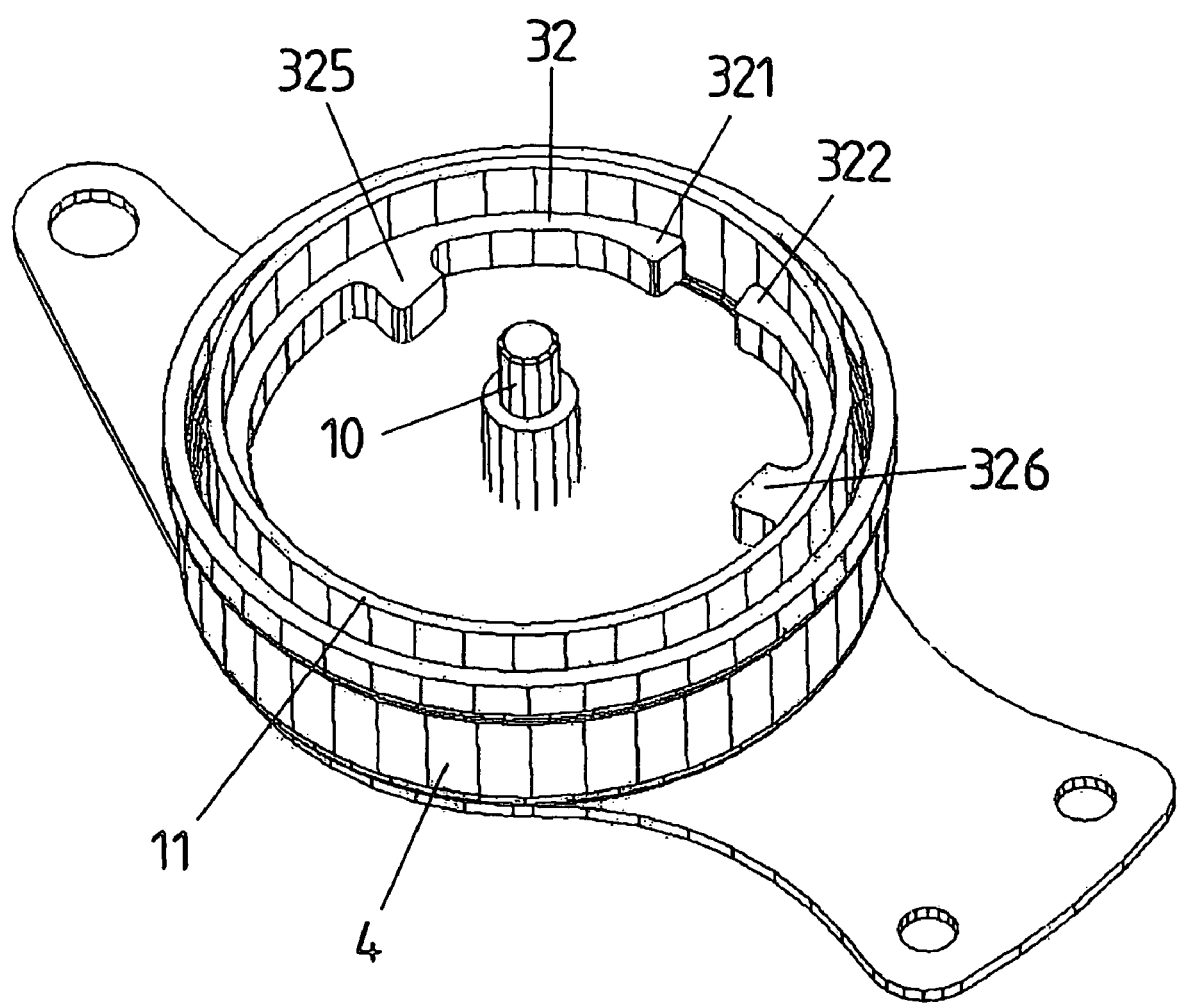
FIG. 4B is a second perspective view of individual phases of the assembly of the adjustment drive according to FIG. 3.

FIG. 4B shows the adjustment drive after inserting the loop spring band 32 with the outer spring ends 321, 322 and the angled support arms 325, 326.

Figure 4C:
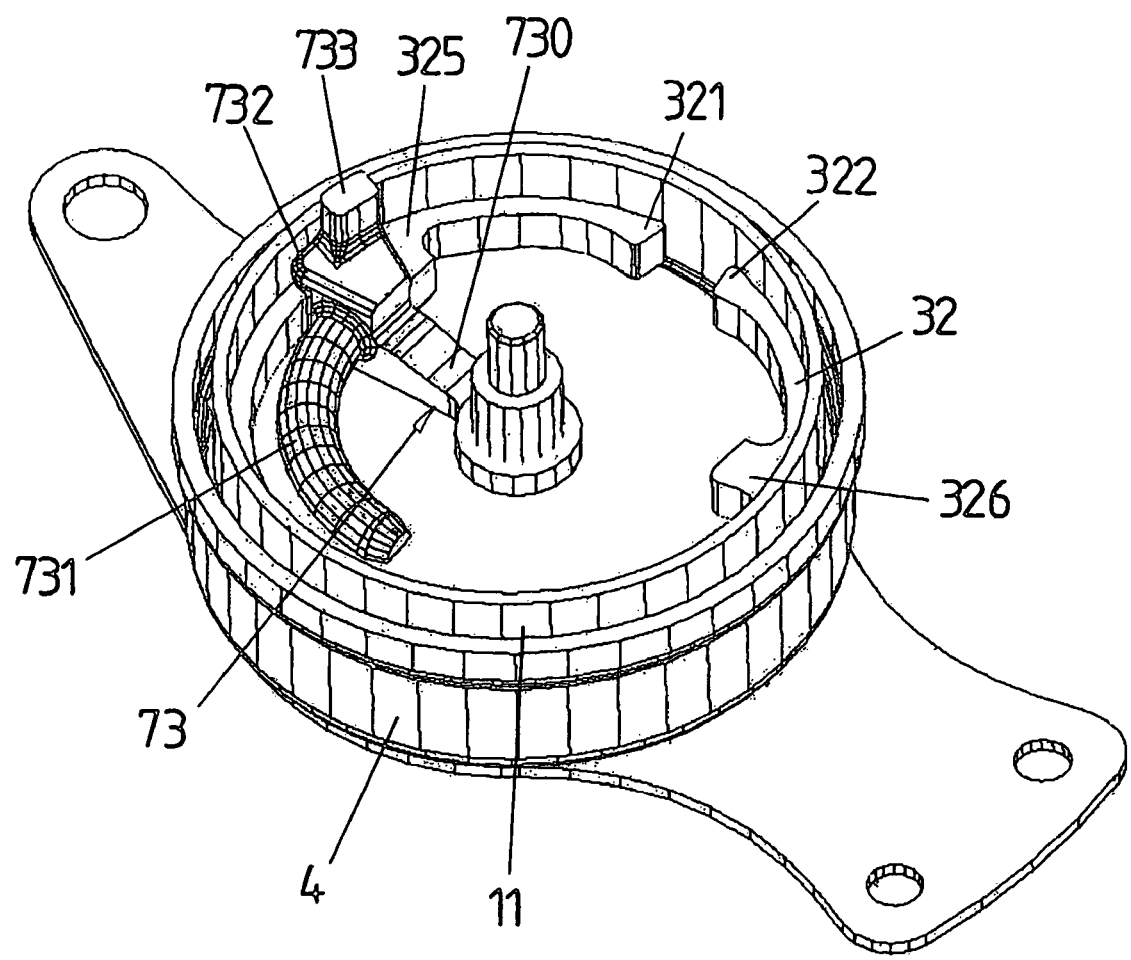
FIG. 4C is a third perspective view of individual phases of the assembly of the adjustment drive according to FIG. 3.

FIG. 4C shows the adjustment drive after inserting the first transfer lever 73, whose radial lever arm 730 is fitted on one side by a flange onto the adjustment axis 10 and on the other side at the opposite end forms the contact nose 732 from which the lever projection 731 extends which runs concentric with the adjustment axis 10. The contact nose 732 forms a stop for the angled lever arm 325 of the loop spring band 32 and has a cam 733 which extends axially from the contact nose 732 and interacts according to FIG. 4g with a stop fixed on the housing.

Figure 4D:
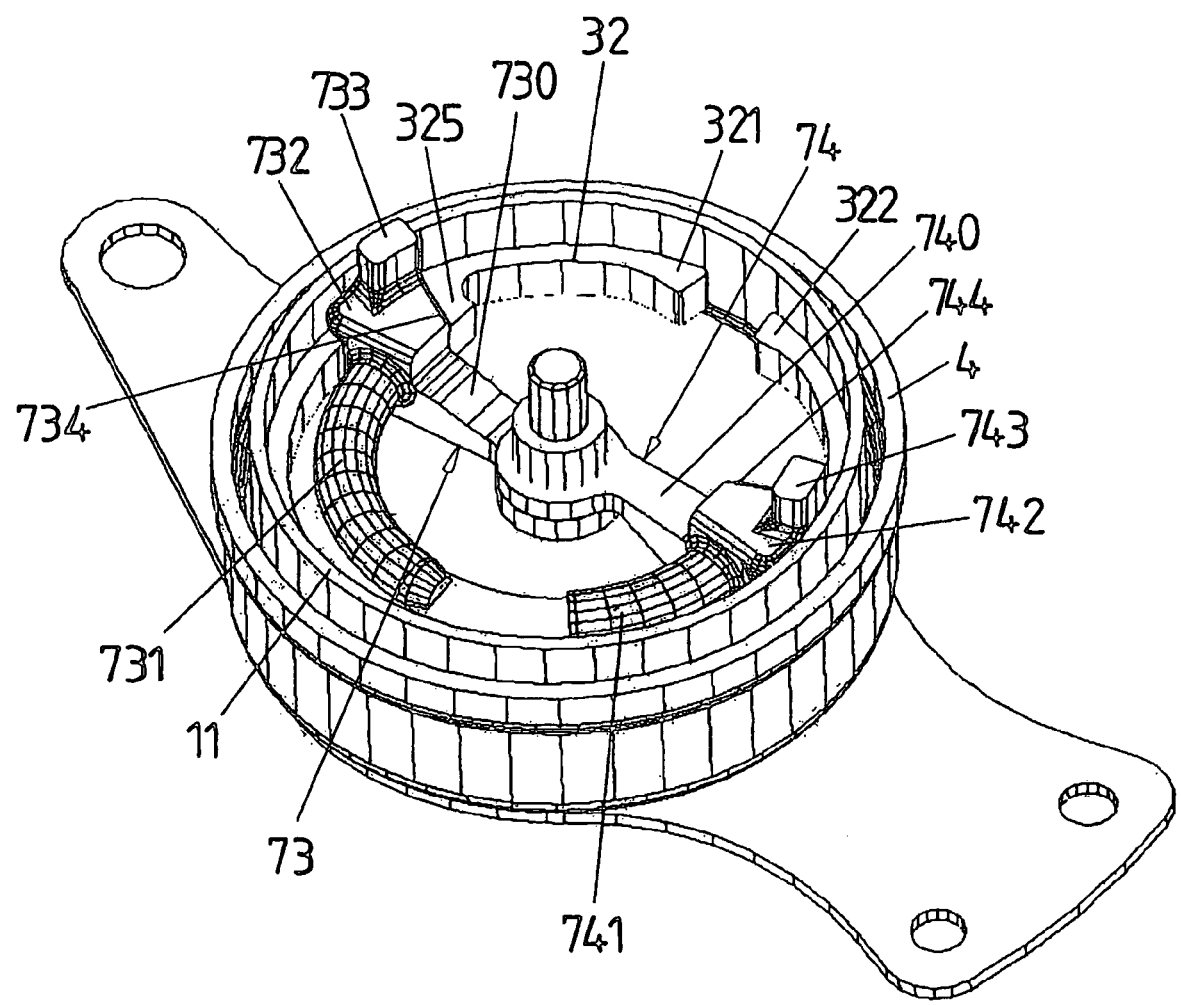
FIG. 4D is a fourth perspective view of individual phases of the assembly of the adjustment drive according to FIG. 3.

FIG. 4D shows corresponding to FIG. 3A the adjustment drive after insertion of the second transfer lever 74 which is fitted on the adjustment axis 10 by a flange formed on the radial lever arm 740 axially offset relative to the flange of the radial lever arm 730 of the first transfer lever 73. At the end opposite the flange the lever arm 740 of the second transfer lever 74 likewise has a contact nose 741 from which a lever projection 741 extends concentric with the adjustment axis 10 and aligned with the lever projection 731 of the first transfer lever 73. From the contact nose 742 of the second transfer lever 74 extends axially likewise a cam 743 which analogous with the cam 733 of the first transfer lever 73 according to FIG. 4G interacts with a stop fixed on the housing.

Figure 4E:
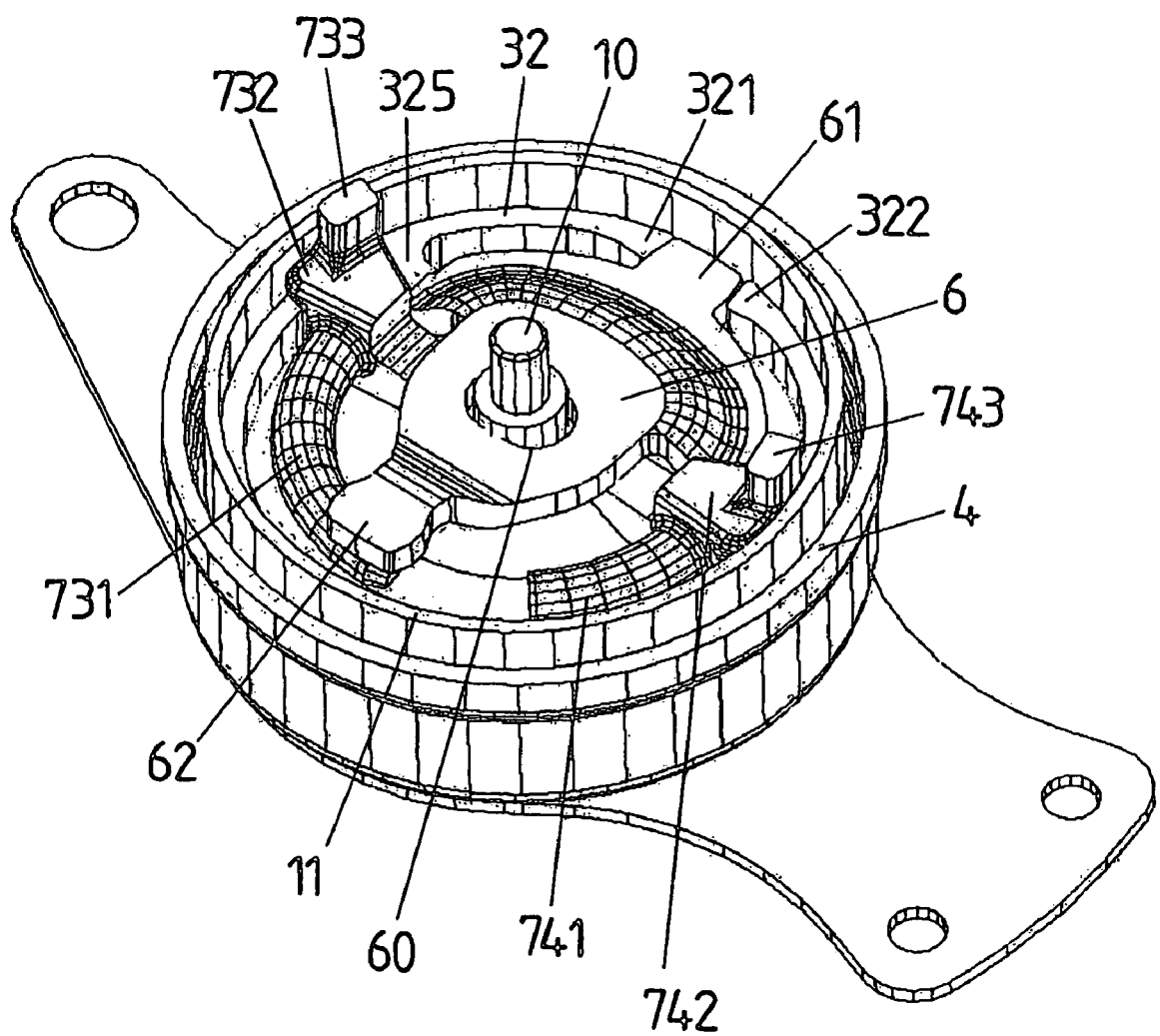
FIG. 4E is a fifth perspective view of individual phases of the assembly of the adjustment drive according to FIG. 3.
Figure 4F:
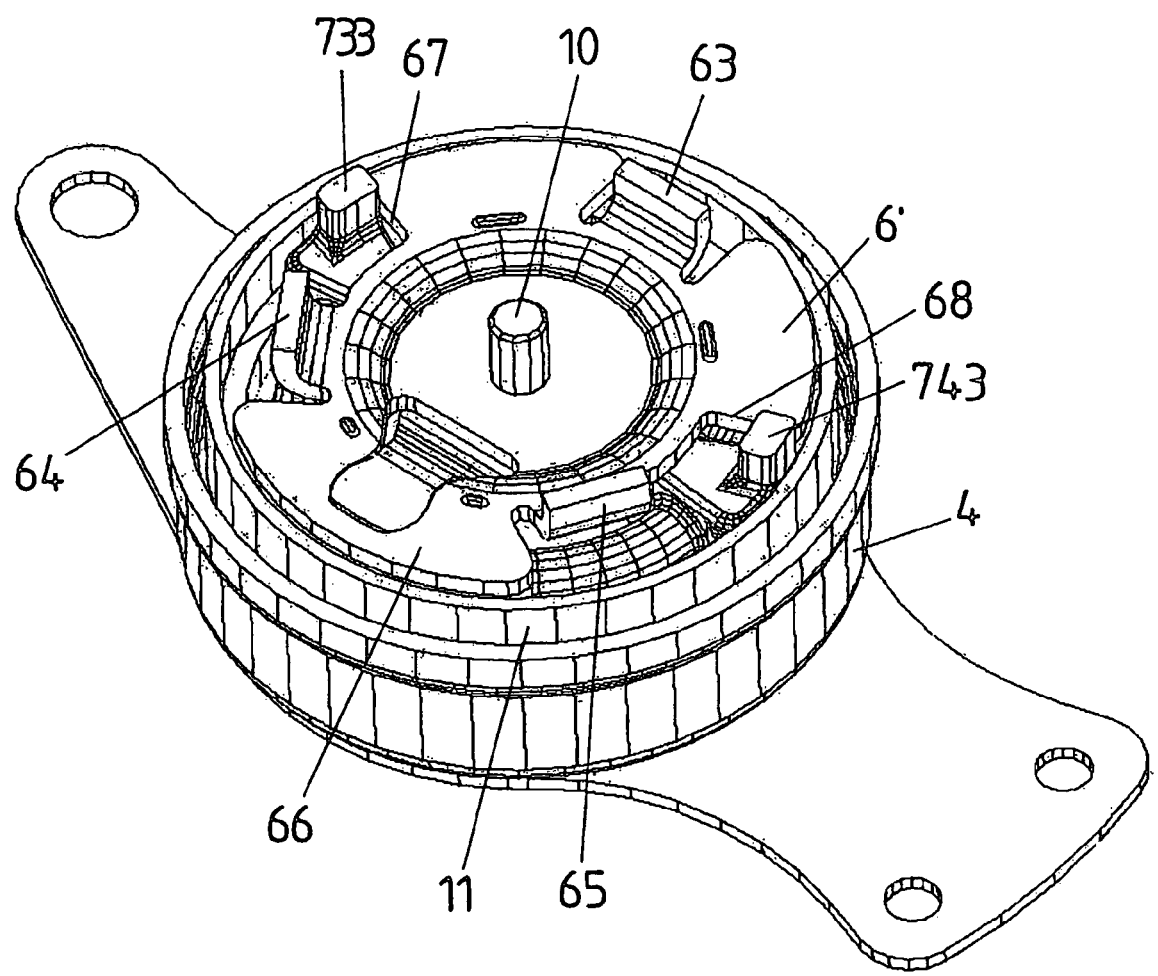
FIG. 4F is a sixth perspective view of individual phases of the assembly of the adjustment drive according to FIG. 3.

FIG. 4E shows, corresponding to FIG. 3B, the adjustment drive after inserting a first reinforcement lever part 6 which is mounted with a cam 61 between the outer spring ends 321, 322 of the loop spring band 32 and is fitted by an oblong hole 60 onto the adjustment axis 10. At its end opposite the cam 61 in relation to the adjustment axis 10 the first reinforcement lever part 6 has a first connecting element 62 which corresponding to the plan view according to FIG. 3C and the perspective view according to FIG. 4F is connected to a second connecting element 66 of a second reinforcement lever part 6' which is fitted by a bore onto the adjustment axis 10 and is connected to the first reinforcement lever part 6.

Figure 3D:
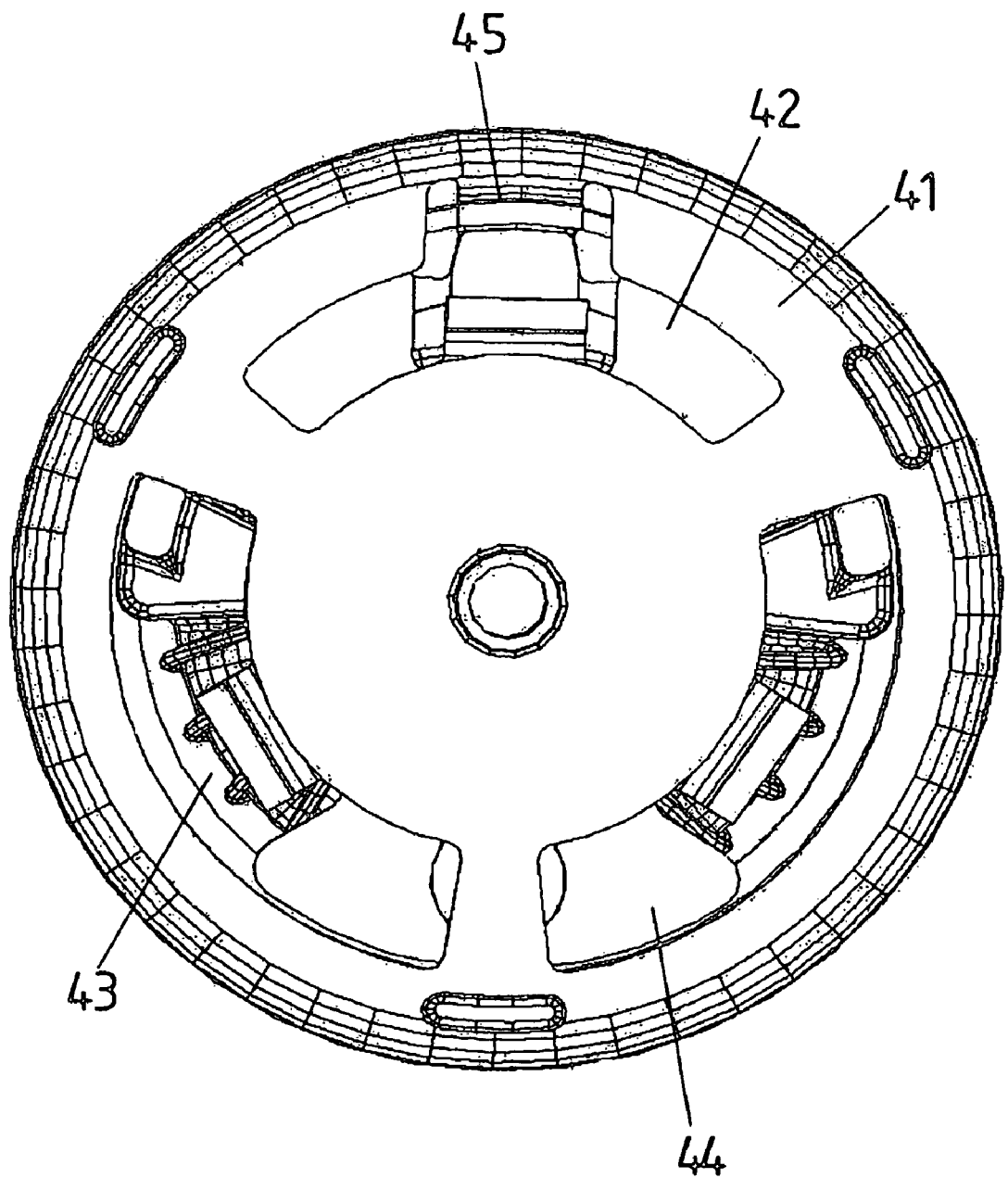
FIG. 3D is a fourth section through an adjustment drive with a single resetting spring between transfer levers in individual phases of the assembly of the adjustment drive.
Figure 4G:
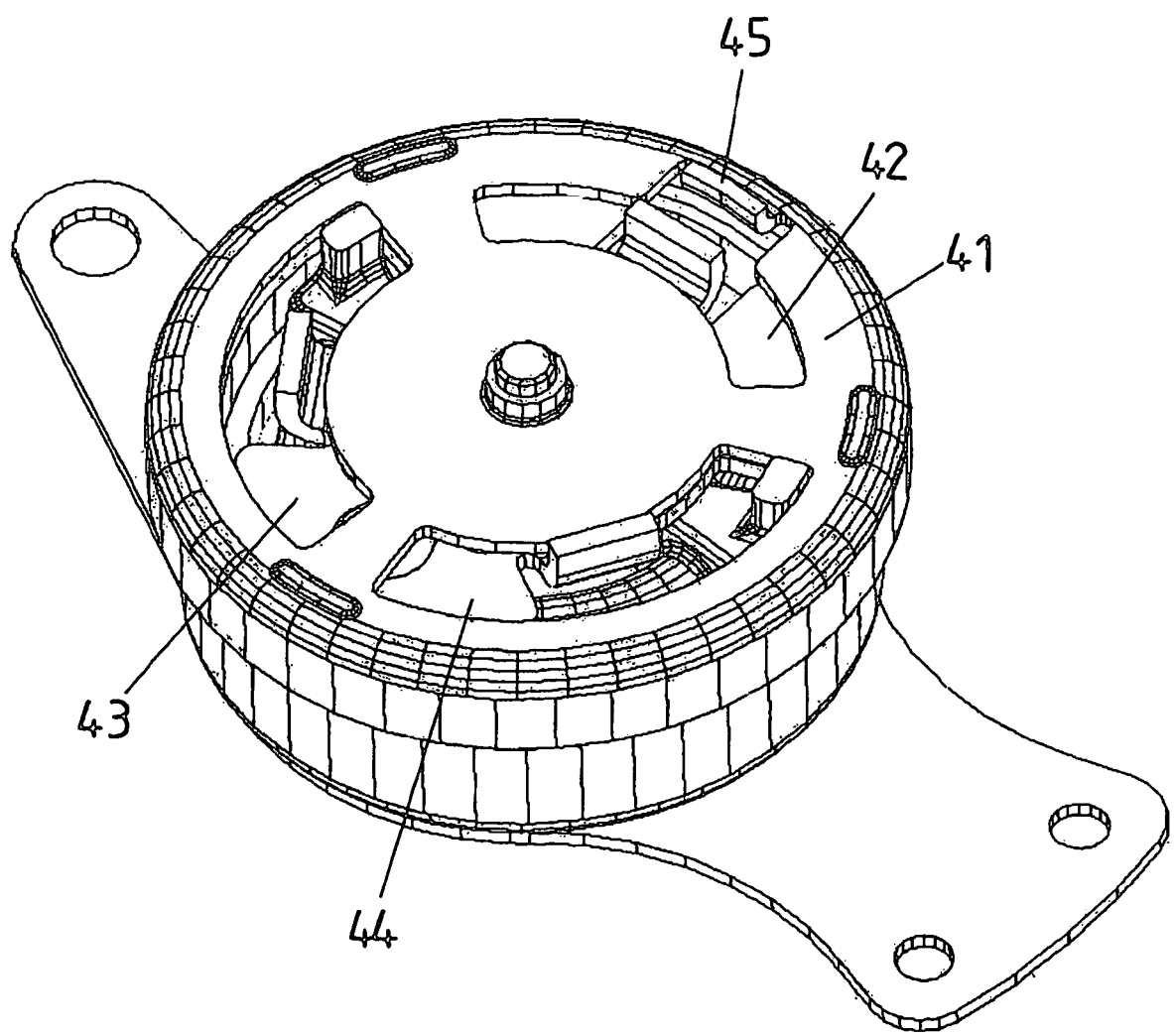
FIG. 4G is a seventh perspective view of individual phases of the assembly of the adjustment drive according to FIG. 3.
Figure 4H:
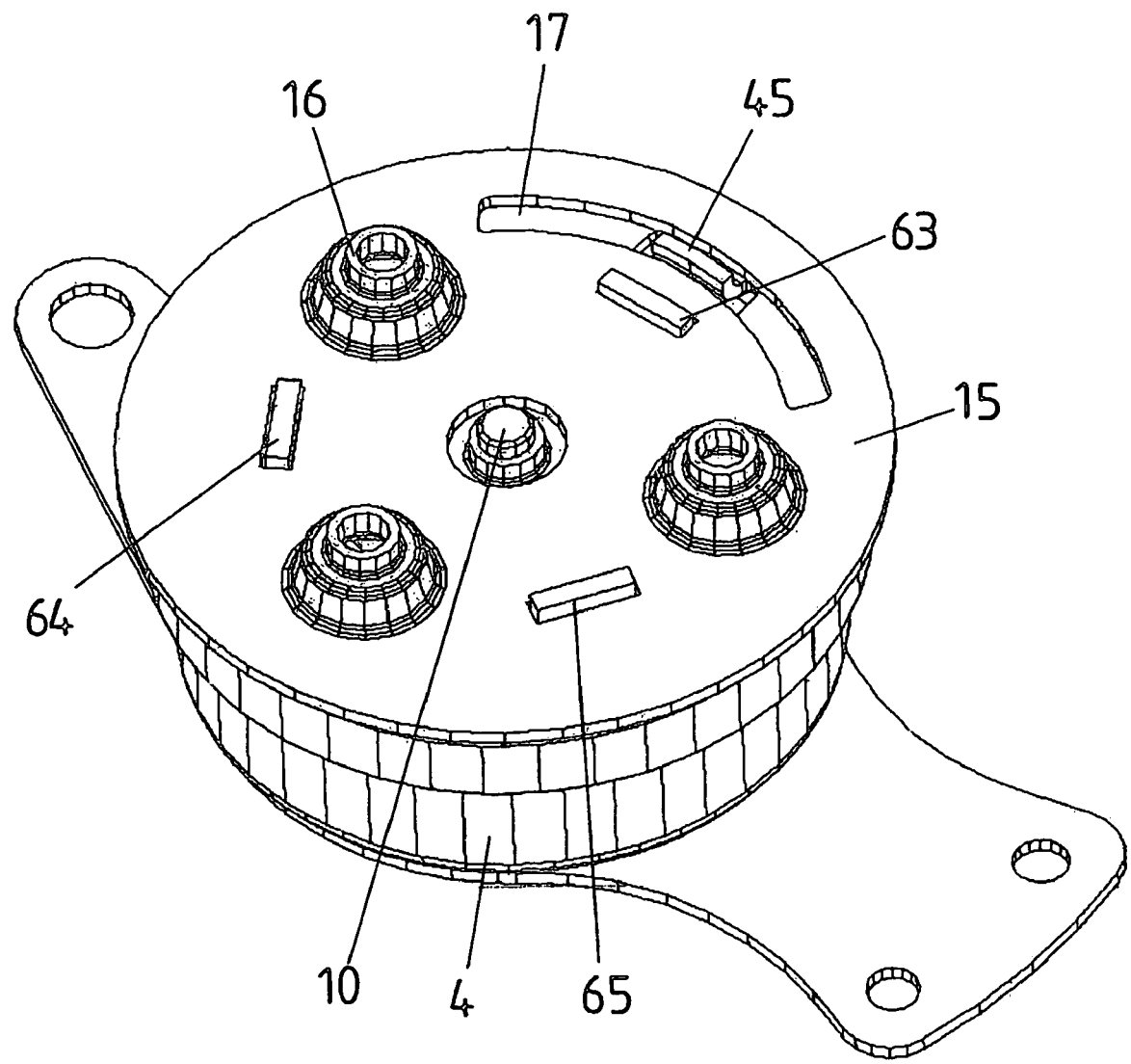
FIG. 4H is an eighth perspective view of individual phases of the assembly of the adjustment drive according to FIG. 3.

The second reinforcement lever part 6' has two stops 67, 68 which bear against the stop cams 733, 743 of the transfer levers 73, 74 as well as three webs 63, 64, 65 which protrude from its surface, preferably angled from the surface, and which according to FIGS. 3D and 4G project through slots 42, 43, 44 running in the housing cover 41 in the circumferential direction concentric with the adjustment axis 10 and according to FIGS. 3E and 4H are pushed into slots 18 of an actuating lever screw-on plate 15 where they thereby produce a connection between the two-part reinforcement lever 6,6' and the actuating lever screw-on plate 15. This has a further slot 17 running concentric to the adjustment axis 10 and in which a web 45 protruding from the housing cover 41 is mounted according to FIG. 4G with its length determining the adjustment stroke of an actuating lever which is connected to the actuating lever screw-on plate 15 through three screw-on points 16.

The section through a further embodiment of an adjustment drive for generating a two-sided rotational movement illustrated in FIG. 5 shows a drive top 11 rotatable about an adjustment axis 10 as the driven element with a hollow cylindrical bearing face 110 and with an actuating lever 1 pivotal about the adjustment axis 10 in one or other direction as the drive element. A loop spring band 33 is inserted floating with pretension into the hollow cylindrical inner space of the drive top 11 and bears under this pretension against the hollow cylindrical bearing face 110 of the drive top 11.

A cam 54 of a reinforcement lever 5' is mounted between the outer thickened spring ends 330, 331 of the loop spring band 33 with a slight play a relative to one of the two outer spring ends 330, 331. The reinforcement lever 5' is formed symmetrical with the axis of symmetry of the adjustment drive and has two legs 58, 59 guided about the adjustment axis 10 and on which bearing faces 56, 57 are provided which run diagonal to the axis of symmetry of the adjustment drive and are opposite the corresponding end faces of two angled support arms 332, 333 of the loop spring band 33. A slight play b is likewise formed between each one of the two bearing faces 56, 57 of the reinforcement lever 5' and the corresponding end face 332, 333 of the loop spring band 33.

A centering and resetting spring 94 is placed between the two legs 58, 59 of the reinforcement lever 5' around a centering sleeve 14 which is mounted concentric with the adjustment axis 10. The spring ends 941, 942 of the centering and resetting spring 94 bear against a stop 40 fixed on the housing, a cam 55 fitted through an opening in the pivotal actuating lever 1 and a projection 334 of the loop spring band 33 in the neutral initial position of the adjustment device.

If the actuating lever 1 is pivoted in one or other direction about the adjustment axis 10 then through the active connection of the actuating lever 1 via the opening in the actuating lever 1 and the cam 55 the reinforcement lever 5' is co-rotated in the swivel direction of the actuating lever 1 until the nose 54 of the reinforcement lever 5' after overcoming the play a bears against the relevant spring end 330, 331 of the loop spring band 33 and the relevant bearing face 56, 57 of the reinforcement lever 5' bears against the corresponding end face 332, 333 of the loop spring band 33 after overcoming the play b, widens out the loop spring band 33 and through the contact of the outside of the loop spring band 33 against the hollow cylindrical bearing face 110 of the drive top 11 entrains this in the pivotal direction of the actuating lever 1. Since both the cam 55 of the reinforcement lever 5' and also the projection 334 of the loop spring band 33 are entrained in the pivotal direction of the actuating lever 1 the centering and resetting spring 94 is widened out and tensioned owing to the bearing contact of one of the two outer spring ends 330, 331.

If at the end of the adjustment stroke of the actuating lever 1 no more force is exerted on the actuating lever 1 then the centering and resetting spring 94 presses the reinforcement lever 5' and loop spring band 33 back into the neutral initial position. Resetting takes place substantially tension-free since the reinforcement lever 5' exerts no force on the outer spring ends 330, 331 or the angled spring ends 332, 333 of the loop spring band 33 so that the latter is moved back into the neutral initial position without any significant friction against the hollow cylindrical bearing face 110 of the drive top 11.

Figure 6:
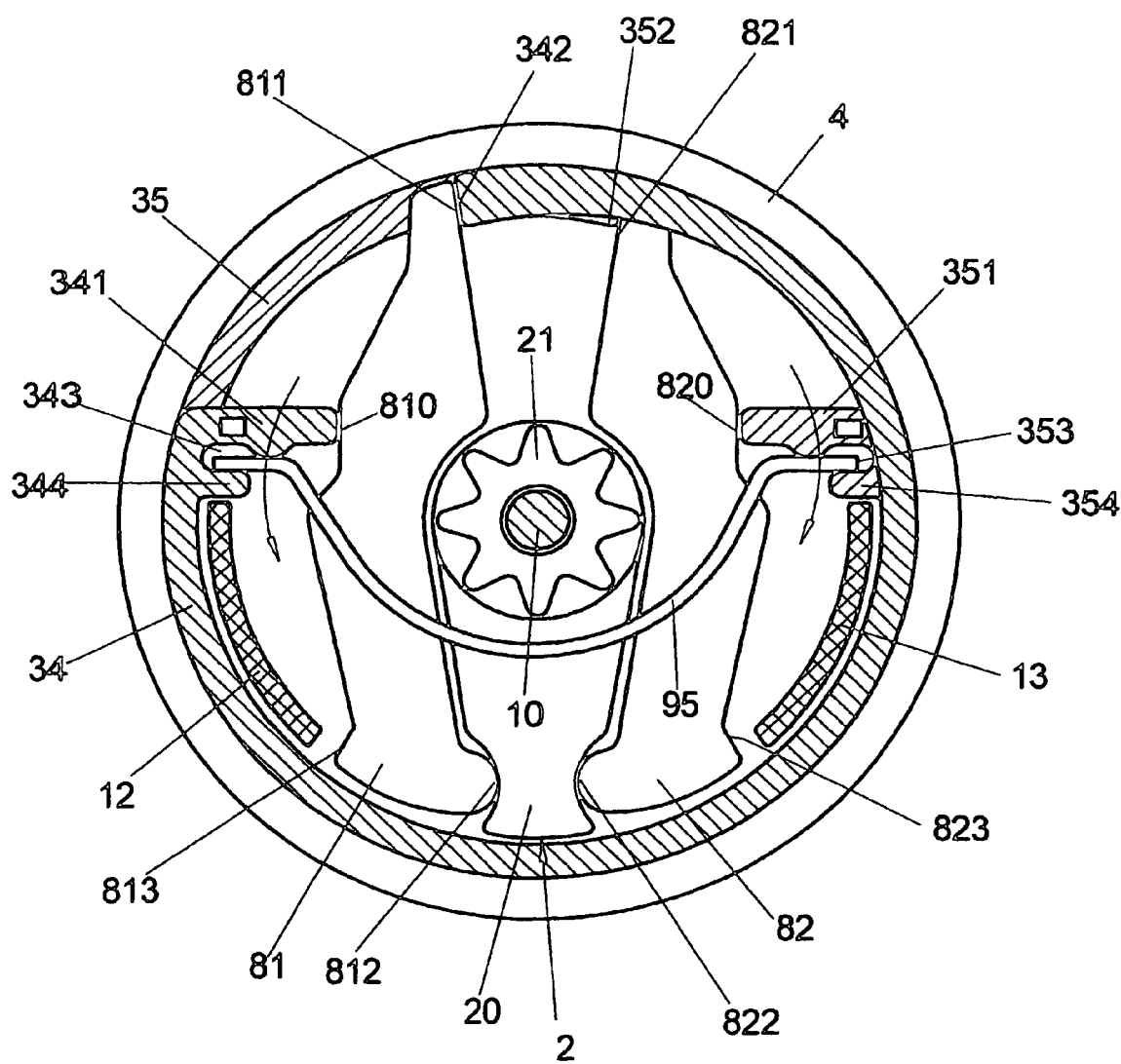
FIG. 6 is a section through an adjustment device designed as a brake lock with two axially off-set loop spring bands, two transfer levers and one leaf spring pretensioning the loop spring bands.

FIG. 6 shows in cross-sectional view an adjustment device formed as a brake lock which blocks torque introduced on the output side as soon as this is greater than torque introduced on the drive side. In this embodiment as a brake lock, loop spring bands 33, 34 are likewise used as force transfer elements in conjunction with reinforcement levers 81, 82.

Two loop spring bands 34, 35 are arranged off-set relative to each other in an adjustment housing 4 and bear against the cylindrical inside wall of the adjustment housing 4. Angled support arms 341, 351 of the loop spring bands 34, 35 bear against a middle bearing face 810, 820 of the two reinforcement levers 81, 82 which are arranged in the adjustment housing 4 secant-shaped on each side of the adjustment axis 10. Outer spring ends 342, 352 of the loop spring bands 34, 35 bear against outer bearing faces 811, 812 of the reinforcement levers 81, 82 which are supported on an output lever 20 of the output element 2 by their bearing noses 812, 822 which are opposite in relation to the drive axis 10.

The angled spring ends 341, 351 of the loop spring bands 34, 35 have sockets 343, 353 in which a resetting spring 95 designed as a leaf spring is hung and the loop spring bands 34, 35 are tensioned towards each other in the direction of the arrow entered in FIG. 6. The two outer spring ends 342, 352 of the loop spring bands 34, 35 thereby press against the outer bearing faces 811, 821 of the reinforcement levers 81, 82 whereby their middle bearing faces 810, 820 are pressed against the angled spring ends 341, 351 and the bearing noses 812, 822 of the reinforcement levers 81, 82 are pressed against the output lever 20. This thereby guarantees both a play-free output and a contact pressing of the loop spring bands 34, 35 against the hollow cylindrical inside face of the adjustment housing 4.

The circular sector shaped drive claws 12, 13 connected to a drive element and more particularly to the drive top 11 according to FIGS. 1 and 2 project into the adjustment housing 4 and lie with their end edges between a stop 344, 354 of the angled support arms 341, 351 of the loop spring bands 34, 35 and stops 813, 823 of the reinforcement levers 81, 82.

With the action of a counter torque clockwise on the output side, the output lever 20 of the output element 2 presses against the bearing nose 812 of the one reinforcement lever 81 so that this reinforcement lever 81 is forced to turn likewise in the clockwise direction. The outer and the middle bearing faces 810, 811 of this reinforcement lever 81 thereby press against the spring ends 341, 342 of the one loop spring band 34. Whereas the force acting from the outer bearing face 811 of the reinforcement lever 81 on the outer spring end 342 of the loop spring band 34 endeavours to rotate the loop spring band 34 in the clockwise direction the force exerted by the middle bearing face 810 on the angled spring end 341 of the loop spring band 34 in conjunction with the friction force generated by the bearing of the loop spring band 34 against the hollow cylindrical inside face of the adjustment housing 4 produces a self-locking effect so that the brake lock is fixed in this position and thus blocks the counter torque introduced on the output side without oppositely directed drive torque.

If the drive top 11 according to FIG. 6 is turned anti-clockwise then this leads in the brake lock to a rotation of the drive claws 12, 13 anticlockwise. The end edge of the drive claw 13 thereby presses against the stop 354 of the angled spring end 351 of the non-loaded loop spring band 35 and lifts it slightly before the drive claw 12 presses against the stop 813 of the reinforcement lever 81 and presses this through its bearing nose 812 against the output lever 20 whereby the output torque introduced can be compensated directly through the drive torque. Instead of through the lower part of the reinforcement lever 81 the force can also according to the embodiments described below with reference to FIGS. 8 to 10 be transferred directly to the output lever 20 through an extension of the drive claws 12, 13.

The brake lock can thus turn following the drive torque acting anti-clockwise and transfer the torque on the drive side which is transferred through the drive claws 12, 13 to the output element 2.

If the drive element and thus the drive claws 12, 13 are turned in the direction of the counter torque on the output side, i.e. clockwise, then the end side of the one drive claw 12 presses against the stop 344 of the loop spring band 34 which is tensioned as a result of the counter torque on the output side. The self locking effect of the loop spring band 34 is lifted and the output element 2 and thus the output pinion 21 which is connected on one side to the output lever 20 and on the other side to an adjusting mechanism—such as for example a seat adjuster—can likewise turn in the clockwise direction.

Figure 7:
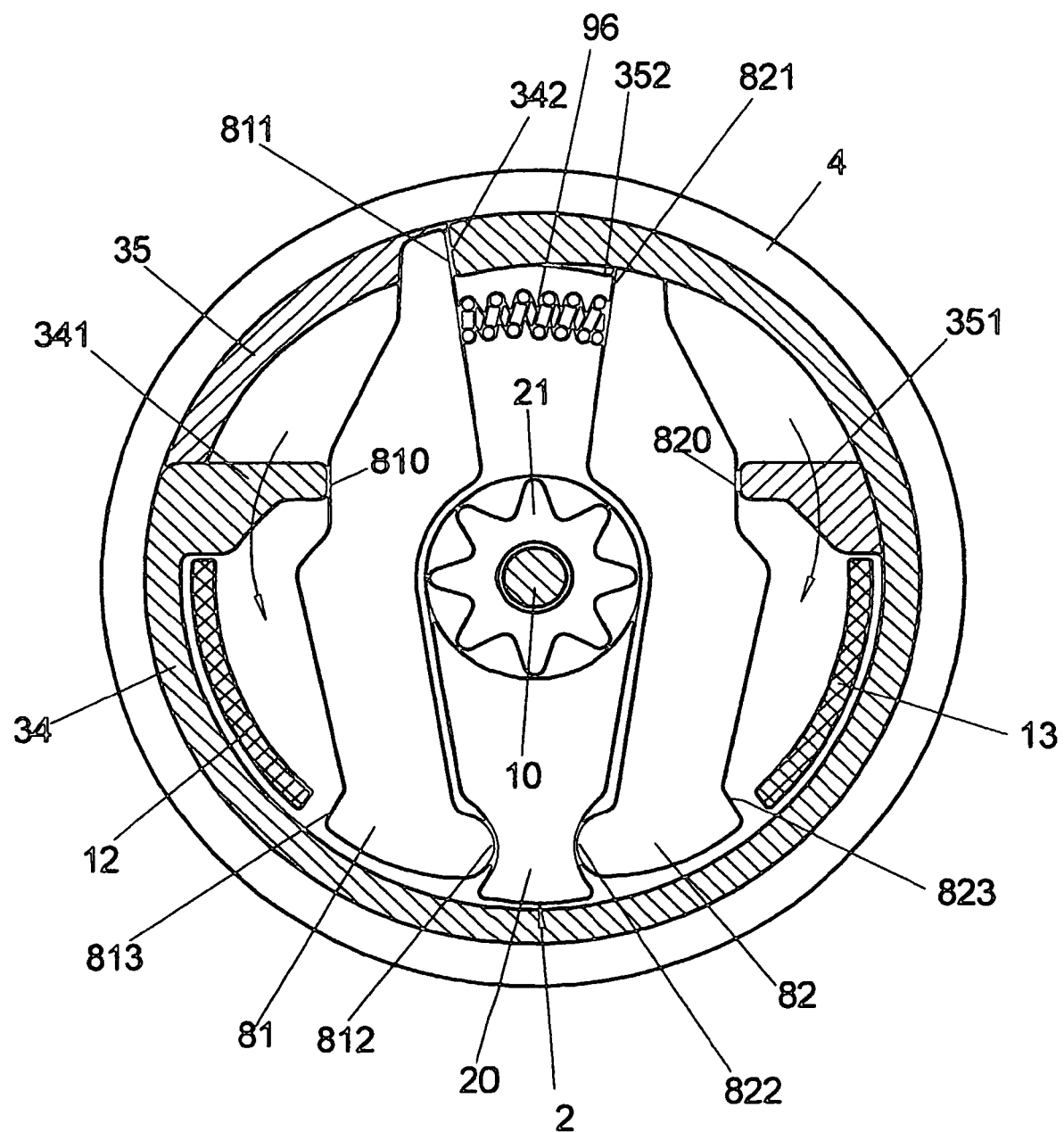
FIG. 7 is a section through an adjusting device formed as a brake lock and having a compression spring mounted between the contact bearing faces of the transfer levers.

FIG. 7 shows a section corresponding to the brake lock according to FIG. 6 through a brake lock in which instead of a bent leaf spring a compression spring 96 mounted between the outer bearing faces 811, 812 of the reinforcement levers 871, 82 is provided as the resetting spring. The angled support arms 341, 351 of the loop spring bands 34, 35 have in this embodiment due to the absence of a bent leaf spring no recesses corresponding to the arrangement according to FIG. 6 and form corresponding stops for the drive claws 12, 13 or bearing faces for the middle bearing faces 810, 820 of the reinforcement levers 81, 82.

Figure 8:
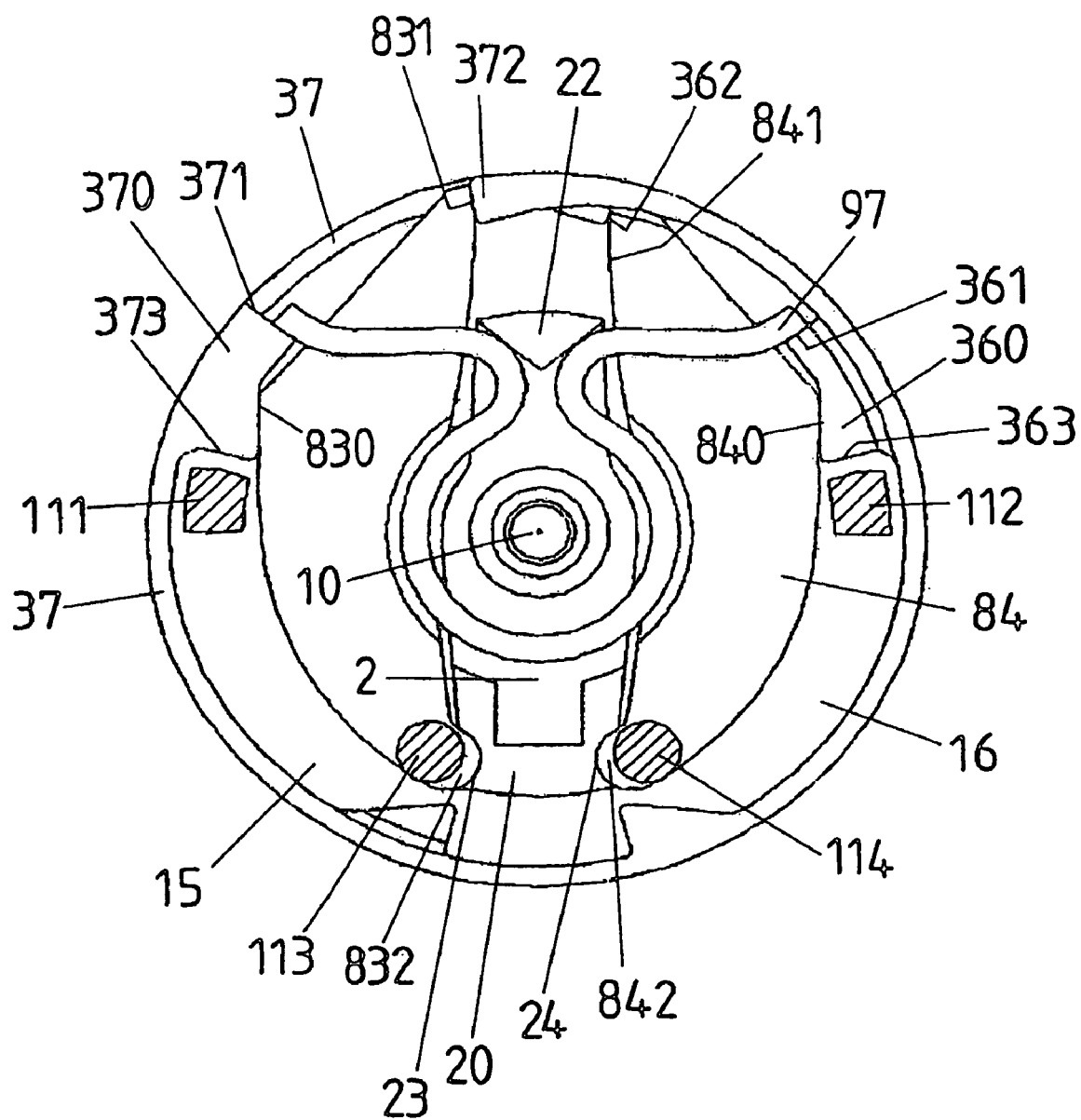
FIG. 8 is a section through an adjustment device designed as a brake lock with two axially off-set loop spring bands, two transfer levers, an omega spring pretensioning the loop spring bands and control elements of a drive top engaging directly on the output element.

The embodiment illustrated in plan view in FIG. 8 of an adjustment device formed as a brake lock likewise serves to block torque introduced on the output side which is greater than torque introduced on the drive side but to transfer torque on the drive side which is greater than torque on the output side, to the output.

For better understanding, the brake lock is shown fully assembled in plan view in FIG. 8 whilst FIGS. 9A to 9F show individual assembly phases of the brake lock in order to explain the association between the individual function elements of the brake lock.

Figure 9A:
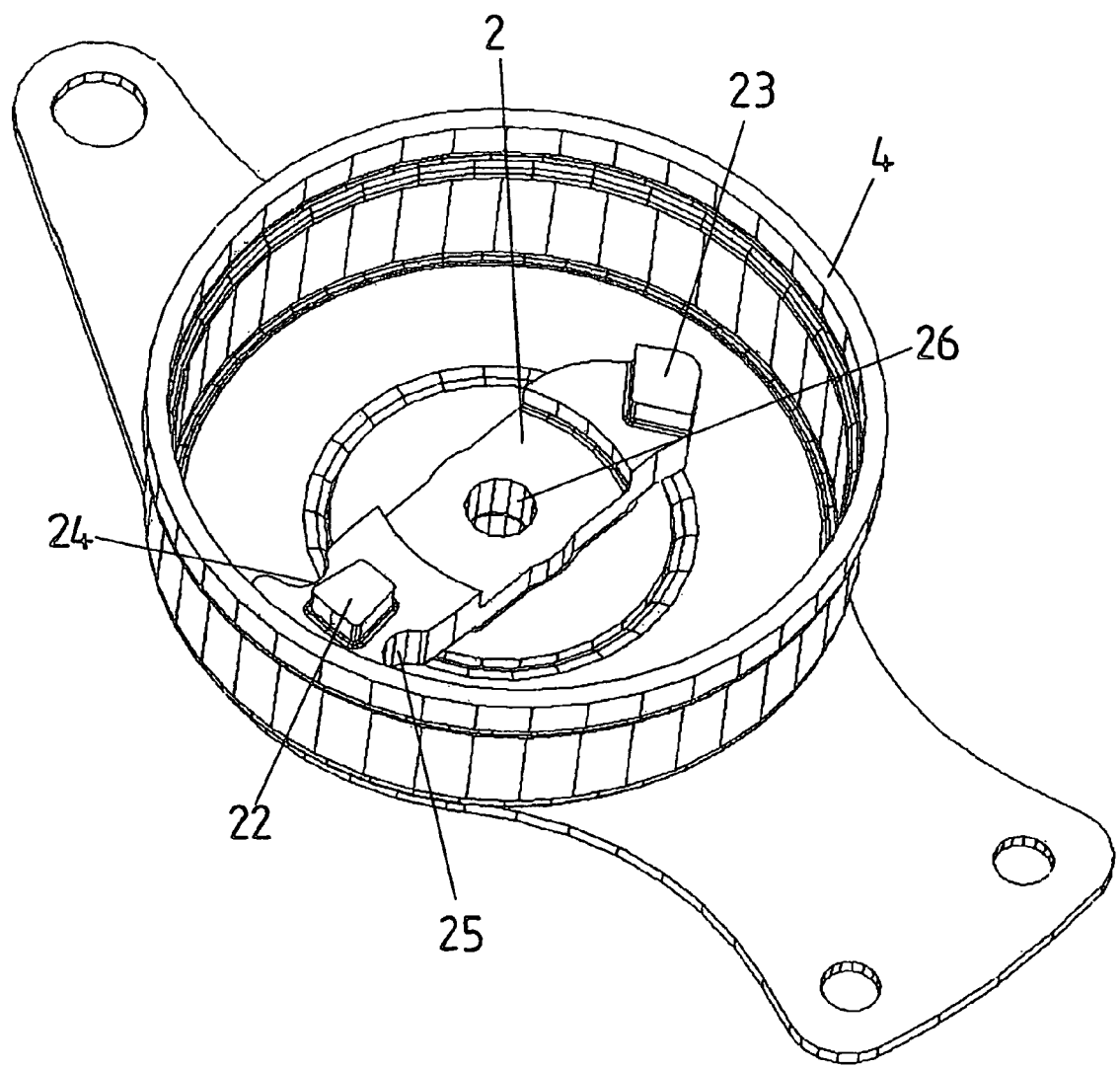
FIG. 9A is a first perspective view of individual phases of the assembly of the adjustment device designed as a brake top according to FIG. 8.

FIG. 9A shows the hollow cylindrical adjustment housing 4 in the base of which the output lever 20 of the output element 2 is inserted which has at one end a resetting spring guide 23 and at the other end an output cam 22 as well as on either side of the output cam 22 recesses 24, 25 as well as a central bore 26 for receiving the adjustment axis 10 according to FIG. 9B.

FIG. 9C shows the brake lock after inserting a first loop spring band 36 which bears against the cylindrical inside wall of the adjustment housing 4. The loop spring band 36 has at its one end the outer thickened spring end 362 as well as at its other end a bearing plate 360 from which a bearing pin 361 protrudes in the axial direction and which in the circumferential direction forms a contact bearing face 363 which corresponds to the bearing faces of the angled support arms 341, 351 of the loop spring bands 34, 35 in the embodiments according to FIGS. 6 and 7.

Figure 9D:
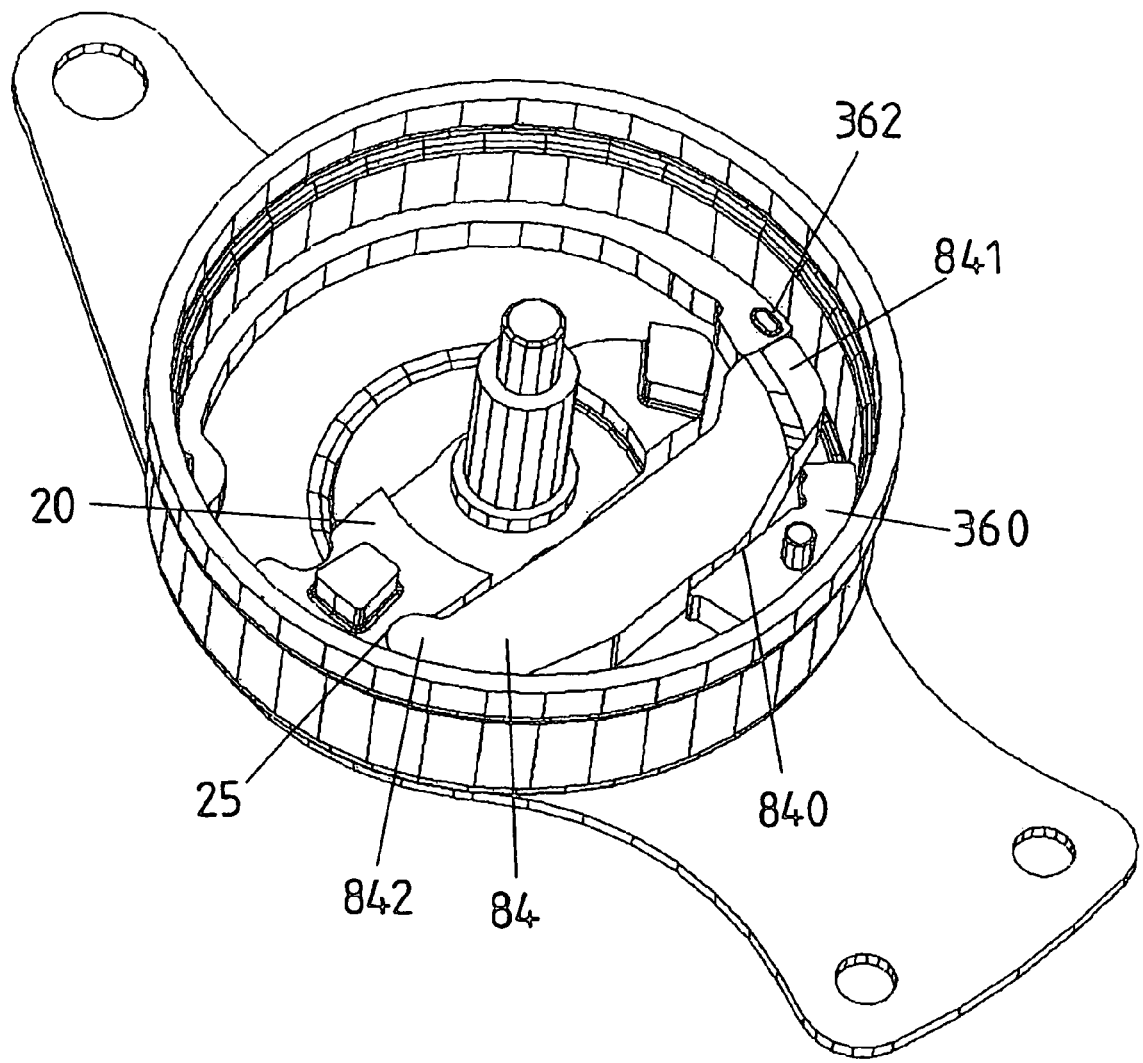
FIG. 9D is a fourth perspective view of individual phases of the assembly of the adjustment device designed as a brake top according to FIG. 8.

FIG. 9D shows the brake lock after inserting a first reinforcement lever 84 which bears by its outer bearing face 841 against the outer spring end 362 of the loop spring band 36. A middle bearing face 840 of the reinforcement lever 84 bears against the bearing plate 360 of the loop spring band 36 whilst the other end of the reinforcement lever 84 forms a stop nose 842 which engages in the recess 25 of the output element 2.

Figure 9E:
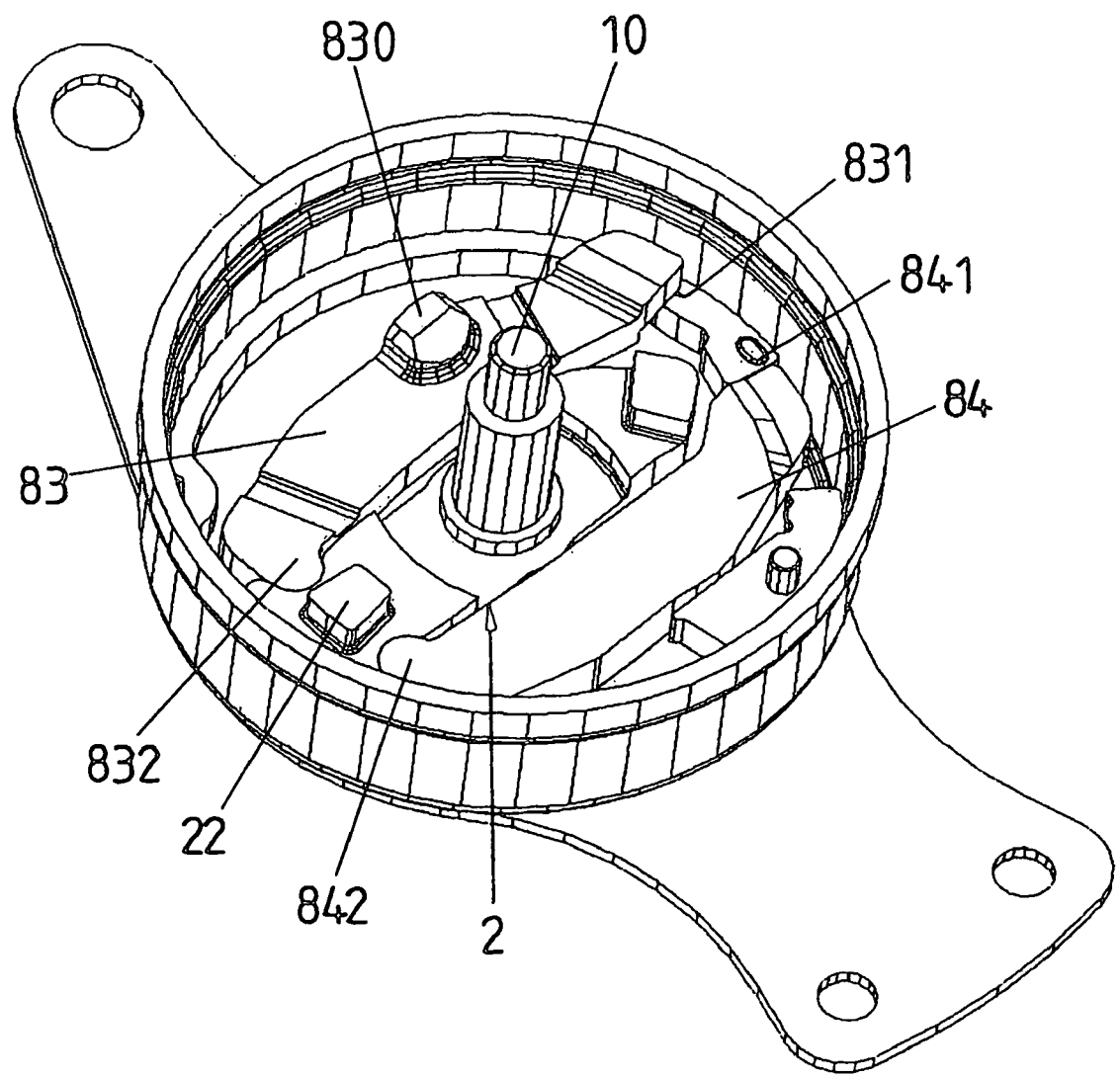
FIG. 9E is a fifth perspective view of individual phases of the assembly of the adjustment device designed as a brake top according to FIG. 8.
Figure 9F:
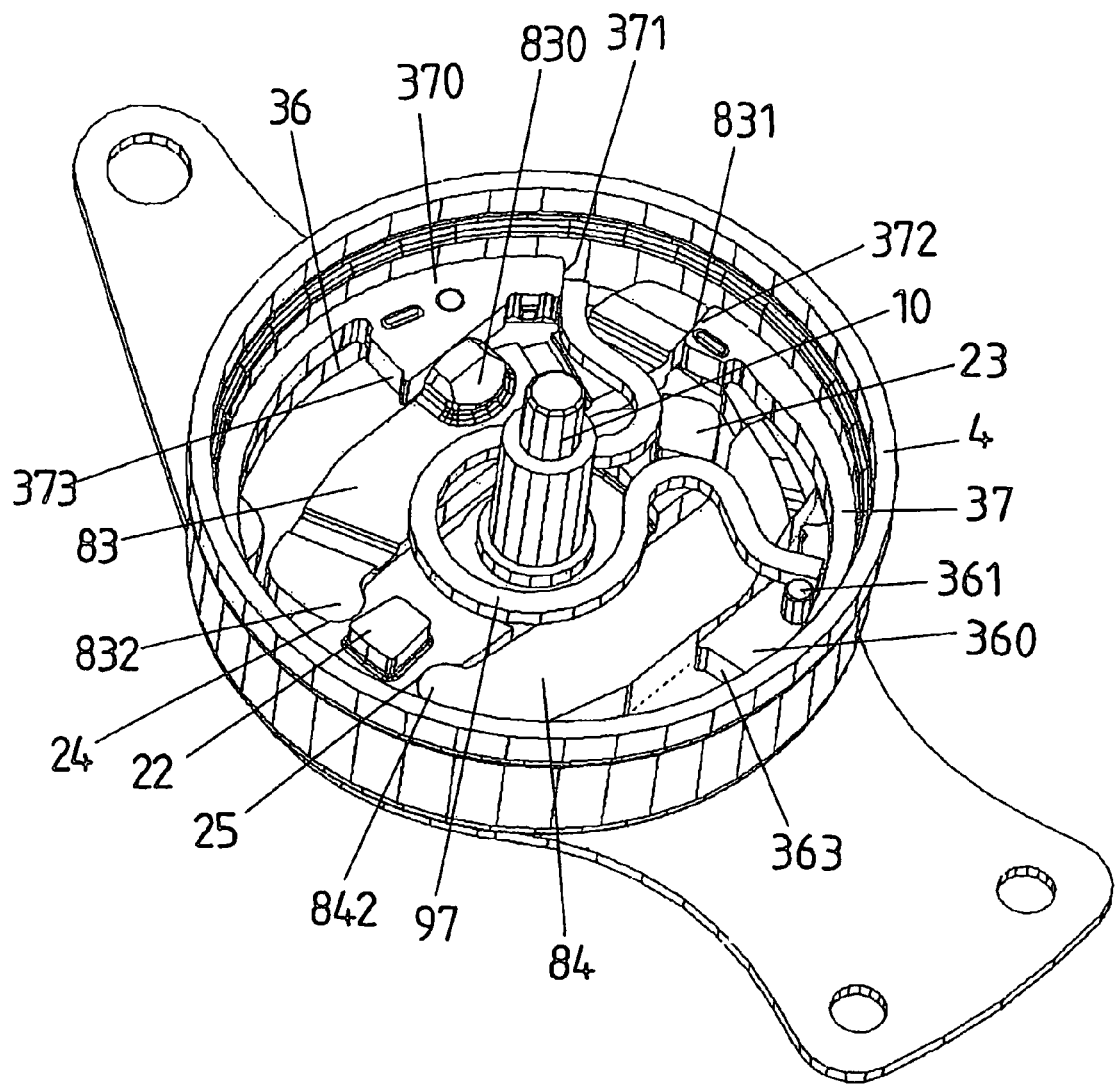
FIG. 9F is a sixth perspective view of individual phases of the assembly of the adjustment device designed as a brake top according to FIG. 8.

FIG. 9E shows the brake lock after inserting a second reinforcement lever 83 into the hollow cylindrical adjustment housing 4 of the brake lock. The second reinforcement lever 83 likewise has an outer bearing face 831 at its one end as well as a stop nose 832 at its other end which engages in the recess 24 of the output element 2. A middle bearing face 830 formed as a cam projects perpendicular from the surface of the second reinforcement lever 83 and serves for tensioning during action of torque on the output side. The second loop spring band 37 is inserted according to FIG. 9F into the hollow cylindrical adjustment housing 4 so that its outer spring end 372 comes to bear against the outer bearing face 831 of the second reinforcement lever 83.

A bearing plate 370 corresponding to the angled spring end of the loop spring bands in the embodiments according to FIGS. 6 and 7 forms on the one hand a bearing surface for the middle bearing surface or the bearing cam 830 protruding perpendicularly from the second reinforcement lever 83 and on the other a bearing face 373 for a control element 111 illustrated in FIG. 8 of the drive top or driven element as well as a bearing face 371 for a resetting spring 97 formed as an omega spring whose other end bears against the bearing pin 361 of the first loop spring band 36 and thus pretensions the loop spring bands 36,37 in the circumferential direction. The omega spring 97 is thus inserted in the adjustment housing 4 so that its laterally protruding legs bear against the resetting spring guide 23 which protrudes perpendicularly from the surface of the output lever.

FIG. 8 shows the complete assembled brake lock in plan view after inserting the drive top or driven element, of which the control elements 111 to 114 protruding therefrom are shown in sectional view in FIG. 8. The control elements 111 to 114 oppose with rotational angular play on the one hand the bearing faces 363, 373 of the loop spring bands 36, 37 and on the other the stop cam 22 of the output element 2. Different from the embodiments of a brake lock illustrated in FIGS. 6 and 7 the control elements 113, 114 do not bear against the stops 813, 823 of the reinforcement levers 83, 84 but directly against the drive cam 22 of the output element 2.

With action of counter torque on the output side in the clockwise direction the output lever 20 of the output element 2 presses against the stop nose 832 of the one reinforcement lever 83 so that this reinforcement lever 83 is urged to likewise rotate in the clockwise direction. The bearing cam 830 and the outer bearing face 831 of the reinforcement lever 83 thereby press against the contact bearing plate 370 and the outer spring end 372 of the loop spring band 37. Whereas the force acting from the outer bearing face 831 of the reinforcement lever 83 on the outer spring end 372 of the loop spring band 37 is urged to rotate the loop spring band 37 clockwise the force exerted by the bearing cam 830 on the bearing plate 370 of the loop spring band 37 in conjunction with the friction force produced through the bearing of the loop spring band 37 against the hollow cylindrical inside face of the adjustment housing 4 causes a self-locking effect so that the brake lock is fixed in this position and thus blocks the counter torque introduced on the output side without counteracting drive torque.

If the drive top 11 is rotated anticlockwise then this leads in the brake lock to a rotation of the control elements 111 to 114 anticlockwise. The control element 112 thereby presses against the stop 363 of the bearing plate 360 of the non-loaded loop spring band 36 and lifts it slightly before the control element 113 presses against the cam 22 of the output lever 20 whereby an output torque can be compensated directly through the drive torque. The brake lock can thus rotate following the anti-clockwise acting drive torque and transfer the torque on the drive side to the output element 2.

If the drive element and thus the control elements 111 to 114 are turned in the direction of the counter torque on the output side, i.e. clockwise then the control element 111 presses against the stop 373 of the loop spring band 37 which is tensioned following the counter torque on the output side. The self locking effect of the loop spring band 37 is thereby lifted and the control element 114 can rotate the output lever 20 and thus the output element 2 likewise clockwise.

Figure 10:
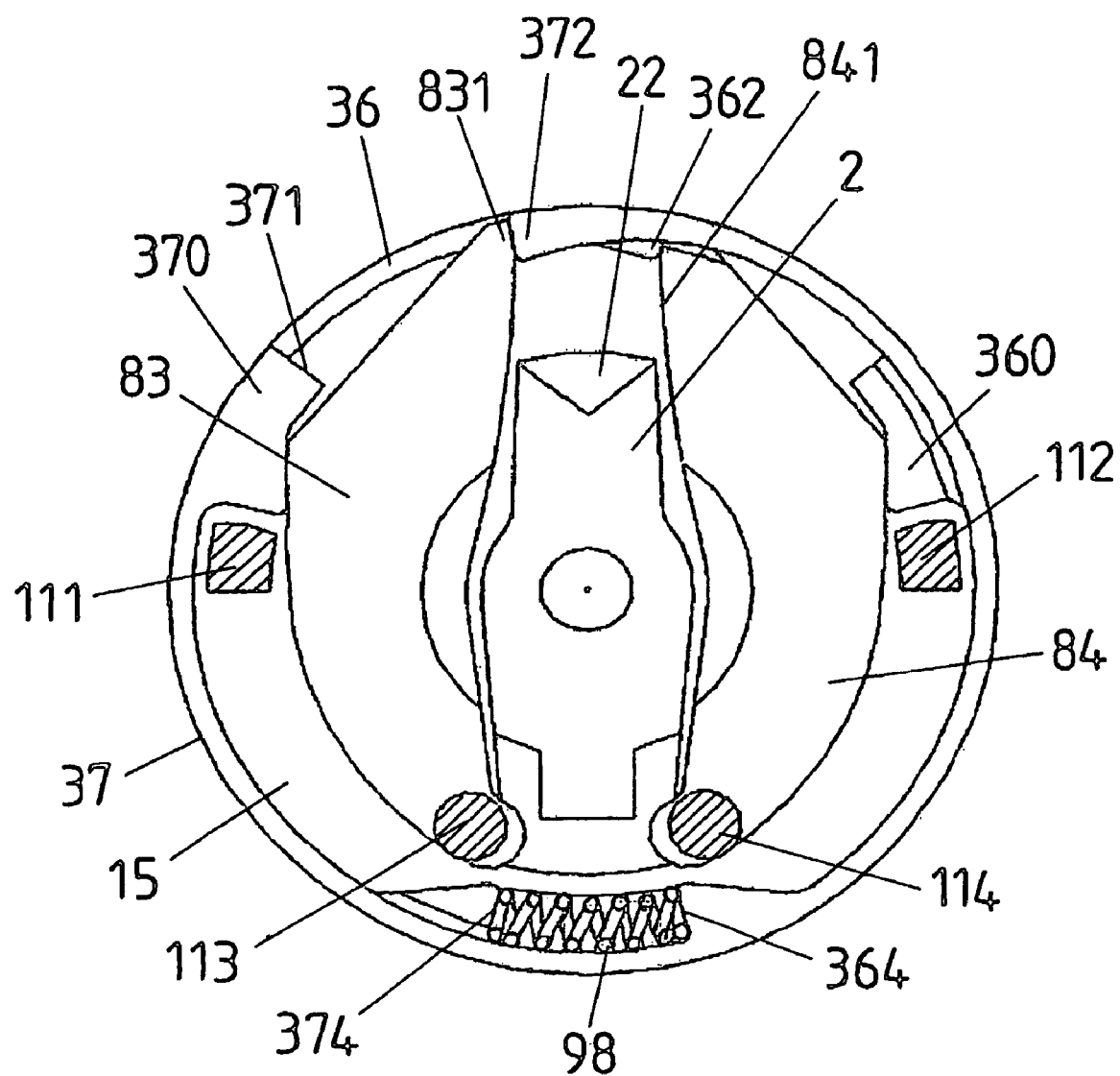
FIG. 10 is a section through an adjusting device designed as a brake lock corresponding to the brake lock according to FIG. 8 with a compression spring between bearing shoulders of the loop spring bands.

The brake lock illustrated in diagrammatic sectional view in FIG. 10 differs from the embodiment according to FIGS. 8 and 9 only in that instead of an omega spring as resetting spring a compression spring 98 is used which is mounted between bearing noses 364, 374 of the loop spring bands 36, 37.

Figure 11:
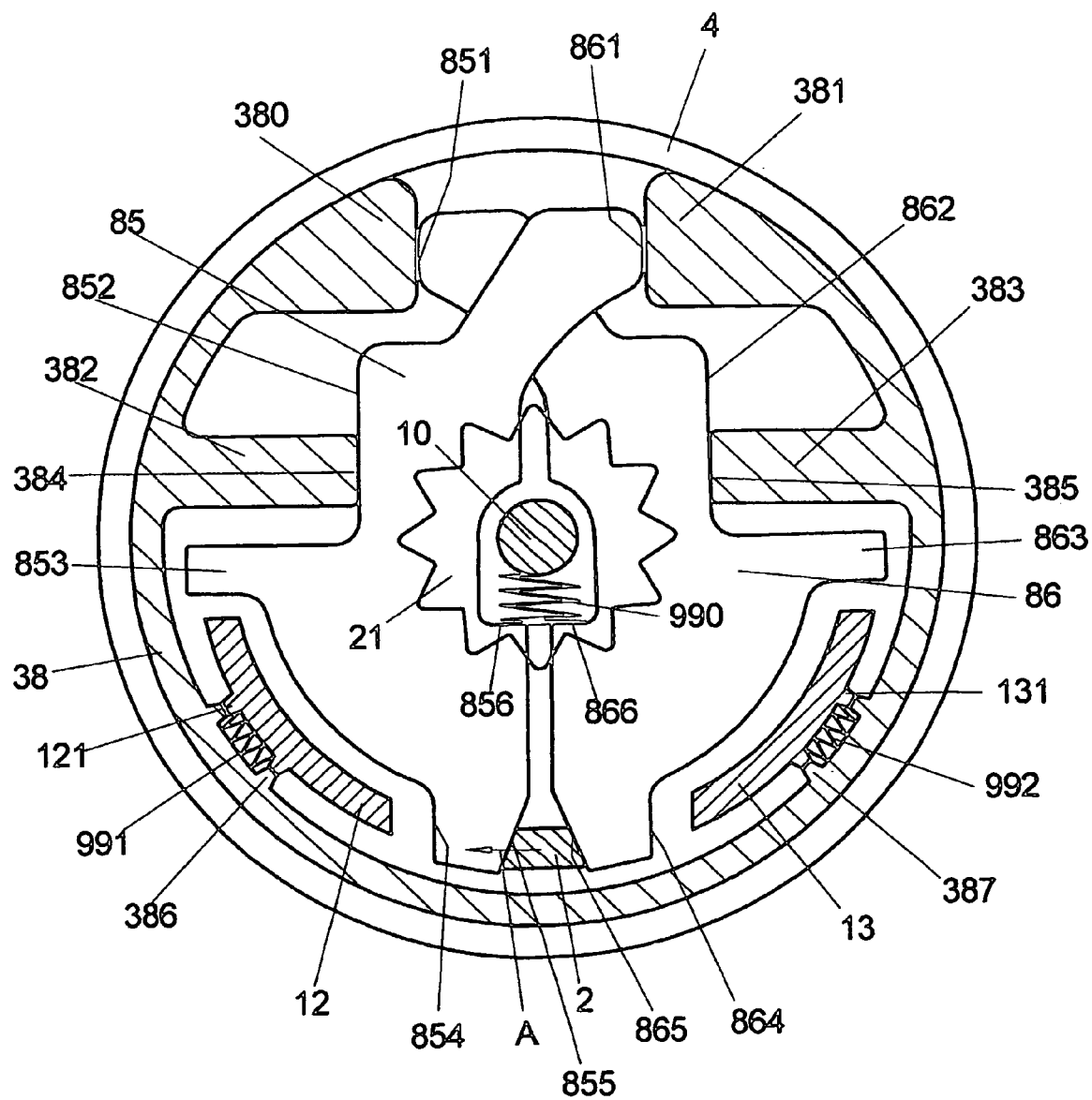
FIG. 11 is a section through a brake lock with a single loop spring band and two reinforcement levers bearing without play on the output element.

FIG. 11 shows a cross-section through an adjustment device likewise formed as a brake lock which blocks torque introduced on the output side as soon as this is greater than torque introduced on the drive side whereby unlike the brake locks according to FIGS. 6 to 10 only one loop spring band 38 is used as force transfer element.

Between the thickened spring ends 380, 381 of the loop spring band 38 are mounted the outer bearing faces 851, 861 which are provided at one end of two reinforcement levers 85, 86. The two reinforcement levers 85, 86 are inserted symmetrical to the axis of symmetry of the brake lock either side of the adjustment axis 10 into the loop spring band 38 whereby the outer bearing faces 851, 861 of the reinforcement levers 85, 86 bear free of play against the thickened outer spring ends 380, 381 of the loop spring band 38.

The ends of the reinforcement levers 85, 86 opposite the output element 2 formed as output cam bear with their conical bearing faces 855, 865 against the output element 2. Through a spring element 990 which is supported on one side on the adjustment axis 10 and on the other on the support faces 856, 866 of the reinforcement levers 85, 86 the freedom of play of the brake lock is guaranteed whereby the reinforcement levers 85, 86 bear against the outer spring ends 380, 381, stop faces 384, 385 of angled support arms 382, 383 of the loop spring band 38 and with conical bearing faces 855, 865 against the output element 2.

The circular sector shaped drive claws 12, 13 connected to the driven element, more particularly to the drive top 11 according to the drive devices of FIGS. 1 to 5 project into the adjustment housing 4 and lie with their end edges between each one stop 853, 863 and outer bearing faces 854, 864 of the reinforcement levers 85, 86. Between the drive claws 12, 13 and the inside of the loop spring band 38 are entrainment springs 991, 992 which bear in the circumferential direction against stops 121, 131 of the drive claws 12, 13 as well as stops 386, 387 on both sides of the loop spring band 38.

If a counter torque on the output side acts clockwise on the brake lock, i.e. in the direction of the arrow A entered on the drive cams 2, and the drive torque emanating from the drive claws 12, 13 acts in the counter direction then the drive claw 13 after bridging the slight play knocks against the bearing face 863 and thus draws the reinforcement lever 86 in the direction of the angled spring end 383 of the loop spring band 38. As a result of the conically aligned inclined faces of the output cam 2 and the outer bearing face 864 of the reinforcement lever 86 the reinforcement lever 86 is moved along this incline so that the tensioning of the loop spring band 38 caused by the tension spring 990 is released.

After the drive claws 12, 13 have covered a further small rotational angle the drive claw 12 contacts the outer bearing face 854 of the reinforcement lever 85 and presses through this outer bearing face 854 against the output cam 2 so that this is moved in the drive direction and thus against the direction of the torque on the output side. The entrainment springs 991, 992 mounted between the drive claws 12, 13 and the loop spring band 38 thereby exert an entrainment force on the loop spring band 38 so that the loop spring band 38 during movement of the drive claws 12, 13 endeavour to move along as well and the friction between the loop spring band 38 and the adjustment housing 4 is easily overcome.

As an alternative for the entrainment of the loop spring band 38 during movement of the drive claws 12, 13 it is also possible to provide a single entrainment spring between one of the two drive claws 12, 13 and the loop spring band 38.

The invention claimed is:

1. An adjustment device for producing a two-sided rotational movement for window lifters and seat adjusters in motor vehicles the adjustment device comprising:
   an adjustment housing,
   a drive element pivotal about an adjustment axis,
   driven element driven by actuation of the drive element with a hollow cylindrical bearing face,
   an output element on an output side,
   an adjustment drive mounted in the force flow between the drive element and the driven element and which transfers an adjusting movement of the drive element only to the driven element when the drive element is moved from a neutral initial position, and
   a brake lock which is mounted between the driven element and the output element and blocks torque introduced on the output side,
   wherein any one of the adjustment drive and the brake lock comprises at least one loop spring band which has a circumference of less than 360° and bearing faces for any one of transferring force from the drive element to the driven element, transferring force from the driven element to the output element, and transferring force from the output element to the adjustment housing.

2. The adjustment device according to claim 1, wherein one of the adjustment drive and the brake lock has a reinforcement lever in active connection with the drive element, wherein the loop spring band bears with pretension at least partially against the hollow cylindrical bearing face of one of the driven element and of the adjustment housing, whereby spring ends of the loop spring band are in active connection with the reinforcement lever.

3. The adjustment device according to claim 1, wherein a reinforcement lever is rotatable with play about the adjustment axis, wherein the reinforcement level comprises:
   at least one cam which is positioned between spring ends of the loop spring band and which to transfer drive torque emanating from the drive element as the drive element pivots from the neutral initial position, widens out the loop spring band so that it bears with friction engagement against the hollow cylindrical bearing face of the driven element; and wherein the reinforcement lever in active connection with transfer levers which during resetting of the drive element from the deflected position into the neutral initial position act on the support arms angled from the loop spring band so that the loop spring band is contracted and its friction locking contact against the hollow cylindrical bearing face of the driven element is lifted.

4. The adjustment device according to claim 3, wherein two transfer levers attached to the adjustment axis have lever arms protruding radially from the adjustment axis and associated with an angled support of the loop spring band, the transfer levers configured to bear against a stop fixed on a housing and are in active connection with the reinforcement lever, and wherein between the transfer levers at least one resetting spring is mounted which for resetting the loop spring band and the drive element connected to the reinforcement lever, depending on the direction of the resetting action, presses a radial lever arm of the transfer levers against one of the angle support arms of the loop spring band and against stops of the reinforcement lever.

5. The adjustment device according to claim 4, wherein the at least one resetting spring is mounted on two lever projections which extend from the radial lever arms of the transfer levers the two lever projections bent round in the circumferential direction extending concentric with the adjustment axis from the radial lever arm of the one transfer lever to the radial lever arm of the other transfer lever and are aligned relative to each other, and wherein the resetting spring is supported on the radial lever arms of the transfer levers.

6. The adjustment device according to claim 1, wherein the reinforcement lever has an oblong hole mounted about the adjustment axis.

7. The adjustment device according to claim 1, wherein transfer levers attached to the adjustment axis have a second lever arm which bears against a stop fixed on the housing and against a connecting bolt of the reinforcement lever with the drive element and wherein to reset the drive element depending on the direction of the resetting movement, each second lever arm of the transfer levers presses against the connecting bolt which is connected for articulated movement to the drive element.

8. The adjustment device according to claim 7, wherein two resetting springs are guided on lever projections of the transfer levers and are supported on a radial and second lever arms of the transfer levers.

9. The adjustment device according to claim 7, wherein at ends of radial lever arms of the transfer levers there are contact noses which for resetting the loop spring band press against angled support arms of the loop spring band.

10. The adjustment device according to claim 1, wherein the spring ends and ends of angled support arms of the loop spring band are connected to one another through webs.

11. The adjustment device according to claim 10, wherein the angled support arms of loop spring band have a crack connection.

12. The adjustment device according to claim 1, wherein at ends of radial lever arms of the transfer levers there are contact noses from which stop cams protrude in the axial direction and bear against stops fixed on the housing.

13. The adjustment device according to claim 12, further comprising a two-part reinforcement lever with cams formed on the first reinforcement lever part and mounted between the spring ends of the loop spring band, an oblong hole holding the adjustment axis, and a diagonally opposite first connecting element which is connected to a second connecting element of the second reinforcement lever part which has a bore arranged about the adjustment axis and two stops bearing against the stop cams of the transfer levers.

14. The adjustment device according to claim 13, wherein the two reinforcement lever parts are arranged one above the other in the axial direction.

15. The adjustment device according to claim 12, wherein from a surface of the second reinforcement lever part protrude webs which project through circumferentially aligned slots of a housing cover connected to the adjustment housing and are pushed into socket slots of a lever screw-on plate which is connectable to one of an actuating lever and an actuating wheel.

16. The adjustment device according to claim 1, wherein one of the adjustment drive and the brake lock has a reinforcement lever in active connection with the drive element, and wherein the reinforcement lever has two bearing faces arranged symmetrical to the adjustment axis and running diagonally to an axis of symmetry leading from the connection of the reinforcement lever with the spring ends of the loop spring band to the active connection of the reinforcement lever with the drive element, whereby the bearing faces are opposite corresponding end faces of two angled support arms of the loop spring band, and wherein spring ends of a centering and resetting spring bear against a locally fixed stop, against the active connection-between the reinforcement lever and the drive element and against a projection of the loop spring band.

17. The adjustment device according to claim 16, wherein the centering and resetting spring is placed about a centering sleeve mounted concentric with the adjustment axis.

18. The adjustment device according to claim 1, wherein the brake lock comprises:
at least one loop spring band supported on the adjustment housing for blocking the torque on the output side, and
wherein reinforcement levers mounted between spring ends of the loop spring band and the driven element and which in the event of torque on the output side which is greater than torque on a drive side widen out the loop spring band for friction contact against the adjustment housing and drive claws bearing at least on angled support arms of any one of the loop spring band and first control elements of the driven element which in the event of torque on the drive side which is greater than torque on the driven side lift the friction contact of the loop spring band against the adjustment housing.

19. The adjustment device according to claim 18, wherein second control elements of the driven element are additionally in active connection with the output element and central bearing faces of the reinforcement levers bear against bearing plates of the loop spring band.

20. The adjustment device according to claim 18, wherein the output element contains an output lever which is mounted between the reinforcement levers and which is connected to an output pinion mounted concentric with the adjustment axis.

21. The adjustment device according to claim 18, wherein the reinforcement levers have outer bearing faces mounted between outer spring ends of the loop spring band and have opposite the outer bearing faces bearing noses or conical bearing faces bearing against the output element.

22. The adjustment device according to claim 18, wherein the drive claws projecting into any one of the adjustment housing and the control elements of the driven element bear against stops of the reinforcement levers and against bearing faces of angled support arms of the loop spring band.

23. The adjustment device according to claim 18, wherein the brake lock has two loop spring bands mounted floating in the driven element axially off-set relative to each other and supported on the adjustment housing for blocking torque on the output side whereby the loop spring bands are tensioned towards each other in a circumferential direction with outer spring ends of the loop spring bands pressing against the outer bearing faces of the reinforcement levers and wherein the reinforcement levers are supported in a central region with bearing faces against any one of angled spring ends and bearing plates of the loop spring bands and thereby press with their opposite bearing faces in respect of the adjustment axis against output levers so that an output is set free of play.

24. The adjustment device according to claim 23, wherein the brake lock has two mutually displaceable reinforcement levers which are pretensioned through at least one spring element.

25. The adjustment device according to claim 24, wherein the angled support arms of the loop spring bands have sockets for a bent leaf spring which is supported centrally and connects the angled support arms of the loop spring bands to one another.

26. The adjustment device according to claim 24, wherein the spring element comprises compression spring mounted between the outer bearing faces of the reinforcement levers bearing against the outer spring ends of the loop spring bands.

27. The adjustment device according to claim 24, wherein the spring element comprises an omega spring which is placed about the adjustment axis and is supported with its spring ends against bearing faces of the loop spring bands.

28. The adjustment device according to claim 24, wherein the spring element comprises of a compression spring and bears against opposing stop shoulders of the loop spring bands.

29. The adjustment device according to claim 18, wherein the output element comprises recesses for receiving stop noses of the reinforcement levers which are opposite the outer bearing faces bearing against the outer spring ends of the loop spring bands, and wherein the output element comprises an output cam against which the second control elements of the driven element bear.

30. The adjustment device according to claim 18, wherein at least one pair of bearing faces of the reinforcement levers on either side of an axis of symmetry formed by the adjustment axis and output element have an angled path relative to this axis of symmetry so that the output is set free of play and the loop spring band is pretensioned onto the adjustment housing.

31. The adjustment device according to claim 30, wherein at least one entrainment spring is mounted between stops on either side of the loop spring band and drive claws of the driven element.

* * * * *